(12) United States Patent
Yashiki et al.

(10) Patent No.: US 9,272,308 B2
(45) Date of Patent: Mar. 1, 2016

(54) METHOD OF MANUFACTURING OPTICAL DEVICE

(71) Applicant: TOPPAN PRINTING CO., LTD., Tokyo (JP)

(72) Inventors: Kazuhiro Yashiki, Tokyo (JP); Chikara Sawamura, Tokyo (JP); Koji Umezaki, Tokyo (JP); Akira Kubo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 283 days.

(21) Appl. No.: 13/838,476

(22) Filed: Mar. 15, 2013

(65) Prior Publication Data

US 2013/0209676 A1 Aug. 15, 2013

Related U.S. Application Data

(60) Division of application No. 13/302,461, filed on Nov. 22, 2011, now abandoned, which is a continuation of application No. PCT/JP2010/060306, filed on Jun. 17, 2010.

(30) Foreign Application Priority Data

Jun. 18, 2009 (JP) .................................. 2009-145532
Apr. 13, 2010 (JP) .................................. 2010-092079

(51) Int. Cl.
*B29D 11/00* (2006.01)
*B05D 5/06* (2006.01)
(Continued)

(52) U.S. Cl.
CPC ................ *B05D 5/063* (2013.01); *B42D 25/29* (2014.10); *G02B 5/1842* (2013.01); *G02B 5/32* (2013.01);
(Continued)

(58) Field of Classification Search
CPC .... B42D 15/0013; B05D 5/063; B05D 5/067; B05D 5/068; B05D 5/066; H01L 21/302; H01L 21/30608; H01L 21/30604; G02B 5/18; G02B 5/1861; G02B 5/1838
USPC .............. 216/24, 26, 33, 97, 41, 51; 438/725, 438/736
See application file for complete search history.

(56) References Cited

U.S. PATENT DOCUMENTS 5,044,707 A 9/1991 Mallik
6,271,967 B1 8/2001 Stork
(Continued)

FOREIGN PATENT DOCUMENTS

CN 100352669 C 12/2007
DE 4421407 6/1995
(Continued)

OTHER PUBLICATIONS

International Preliminary Report on Patentability mailed Jan. 26, 2012 in corresponding International Application No. PCT/JP2010/060306.
(Continued)

*Primary Examiner* — Lan Vinh

(57) ABSTRACT

A method of manufacturing an optical device that includes a relief structure formation layer, a first layer made of a first material having a refractive index different from that of a material of the relief structure formation layer, and a second layer made of a second material different from the first material and covering the first layer. A ratio of an amount of the second material at a position of the second region to an apparatus area of the second region is zero or smaller than a ratio of an amount of the second material at the position of the second sub-region to an apparatus area of the second sub region.

9 Claims, 9 Drawing Sheets

(51) Int. Cl.
*G02B 5/18* (2006.01)
*G02B 5/32* (2006.01)
*B42D 25/29* (2014.01)
*B42D 25/324* (2014.01)
*B42D 25/328* (2014.01)

(52) U.S. Cl.
CPC ............. *B42D 25/324* (2014.10); *B42D 25/328* (2014.10); *B42D 2033/18* (2013.01); *B42D 2033/24* (2013.01); *Y10T 428/24612* (2015.01)

(56) References Cited

U.S. PATENT DOCUMENTS

| | | | |
|---|---|---|---|
| 6,909,547 | B2 | 6/2005 | Weiteneder et al. |
| 6,982,209 | B2 | 1/2006 | Chen et al. |
| 8,305,864 | B2 * | 11/2012 | Komma et al. .......... 369/112.07 |
| 2005/0030626 | A1 | 2/2005 | Weiteneder et al. |
| 2006/0063359 | A1 * | 3/2006 | Stacey et al. ................. 438/494 |
| 2006/0063387 | A1 * | 3/2006 | Miller et al. ................. 438/735 |
| 2006/0077496 | A1 * | 4/2006 | Argoitia et al. ................... 359/2 |
| 2007/0031639 | A1 | 2/2007 | Hsu et al. |
| 2007/0292636 | A1 | 12/2007 | Phillips et al. |
| 2008/0272883 | A1 | 11/2008 | Toda et al. |
| 2008/0310025 | A1 | 12/2008 | Staub et al. |
| 2010/0071237 | A1 | 3/2010 | Toda et al. |

FOREIGN PATENT DOCUMENTS

| | | |
|---|---|---|
| JP | 4-212984 | 8/1992 |
| JP | 2524092 | 11/1996 |
| JP | 11-505046 | 5/1999 |
| JP | 2002-372610 | 12/2002 |
| JP | 2003-255115 | 9/2003 |
| JP | 2004-117683 | 4/2004 |
| JP | 2004-302269 | 10/2004 |
| JP | 2005-7624 | 1/2005 |
| JP | 2005-524858 | 8/2005 |
| JP | 2005-533290 | 11/2005 |
| JP | 2007-118563 | 5/2007 |
| JP | 2008-107470 | 5/2008 |
| JP | 2008-107472 | 5/2008 |
| JP | 2008-530600 | 8/2008 |
| JP | 2008-275740 | 11/2008 |
| JP | 2009-63703 | 3/2009 |
| JP | 2009-75169 | 4/2009 |
| JP | 2009-86111 | 4/2009 |
| JP | 2009-109871 | 5/2009 |
| TW | 200807191 | 2/2008 |
| WO | WO 2006/084685 A2 | 8/2006 |
| WO | 2009/040960 | 4/2009 |

OTHER PUBLICATIONS

International Search Report for PCT/JP2010/060306 mailed Aug. 31, 2010.
Japanese Office Action mailed Mar. 13, 2012 issued in corresponding Japanese Application No. 2011-022740.
Extended European Search Report issued Sep. 5, 2012 in corresponding European Patent Application No. 10789559.1.
Chinese Office Action mailed May 6, 2013 in corresponding Chinese Application No. 201080026768.6.
Taiwanese Office Action mailed May 23, 2013 in corresponding Taiwanese Application No. 099119788.
European Communication dated Jul. 10, 2015 in corresponding European Patent Application No. 10789559.1.

* cited by examiner

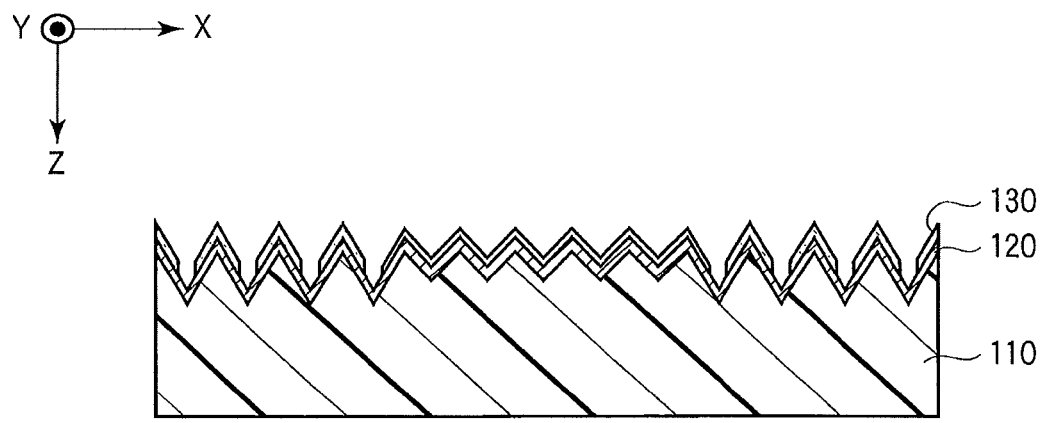
F I G. 5
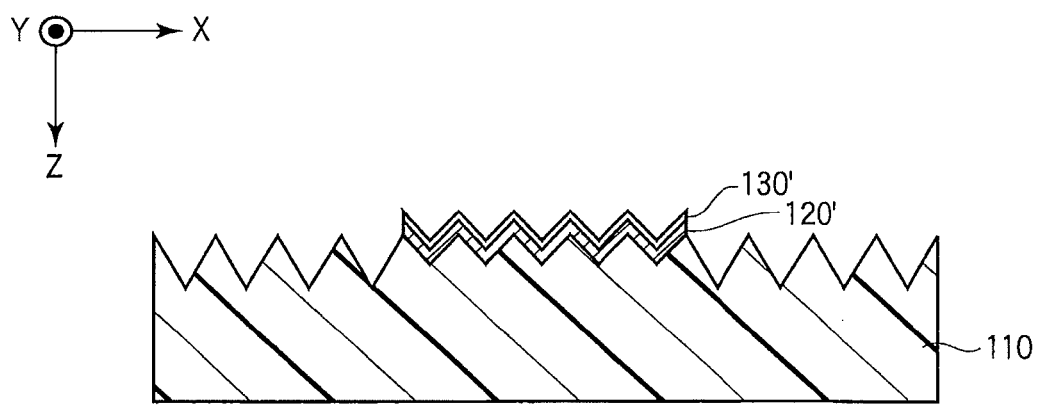
F I G. 6

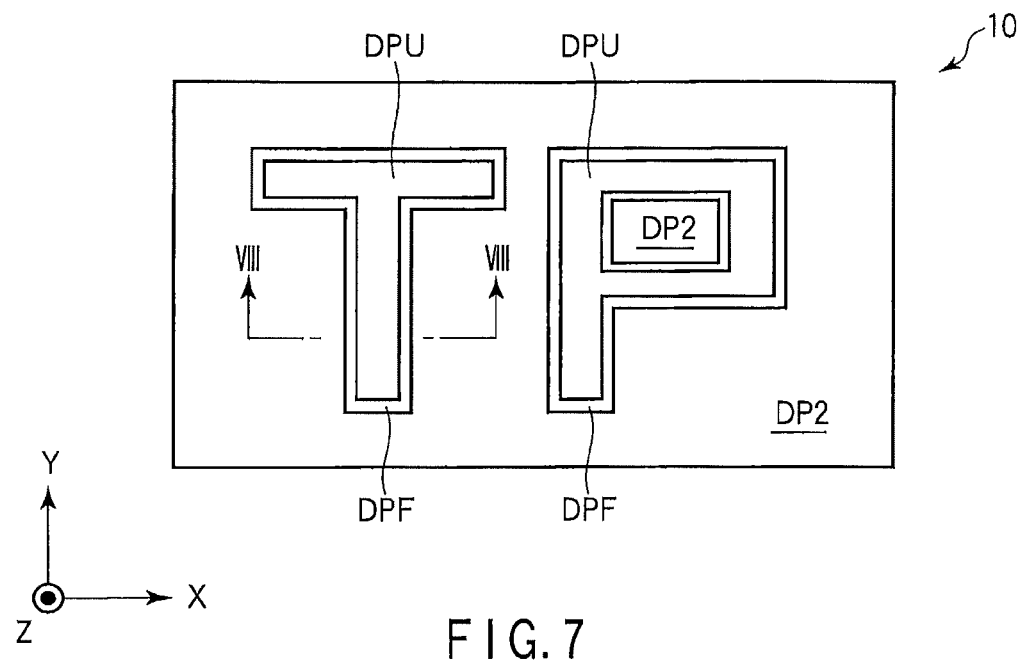
F I G. 7
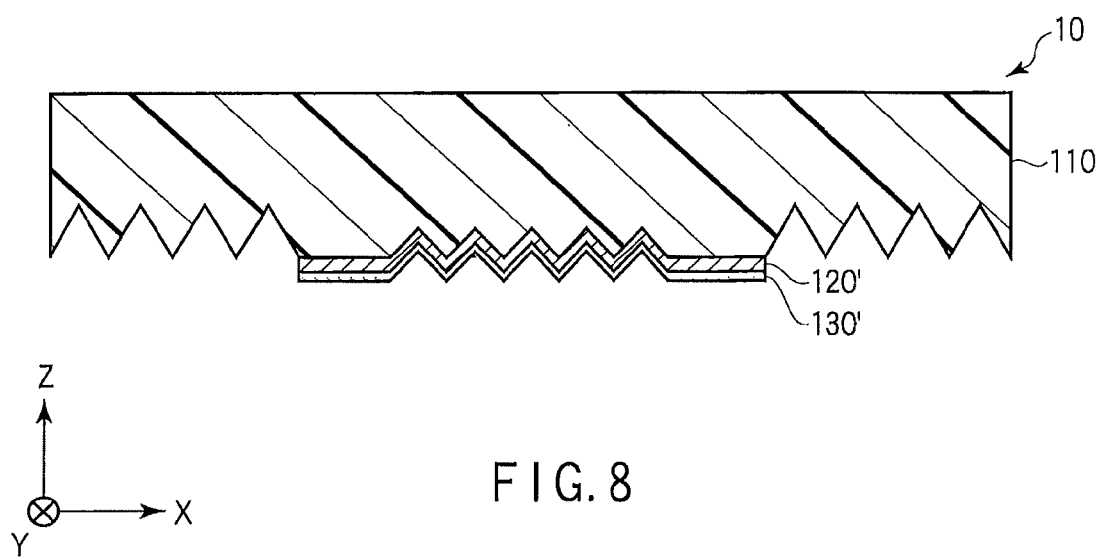
F I G. 8

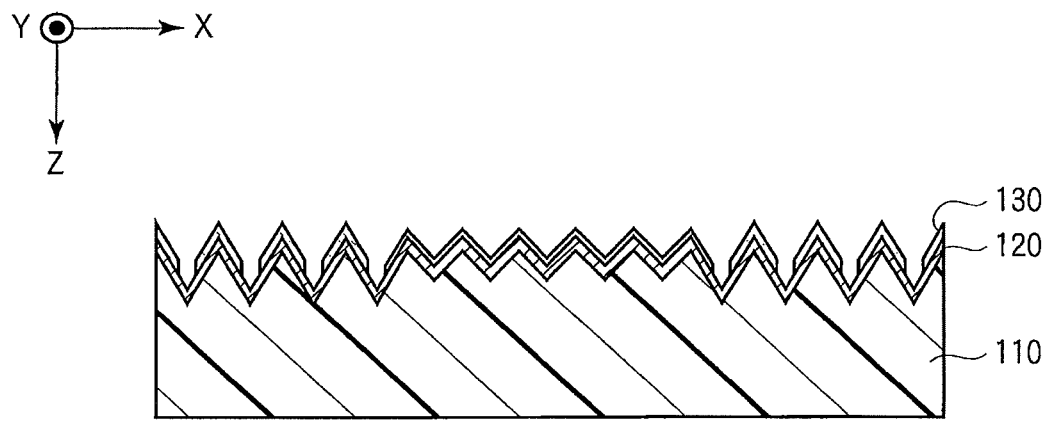
F I G. 15
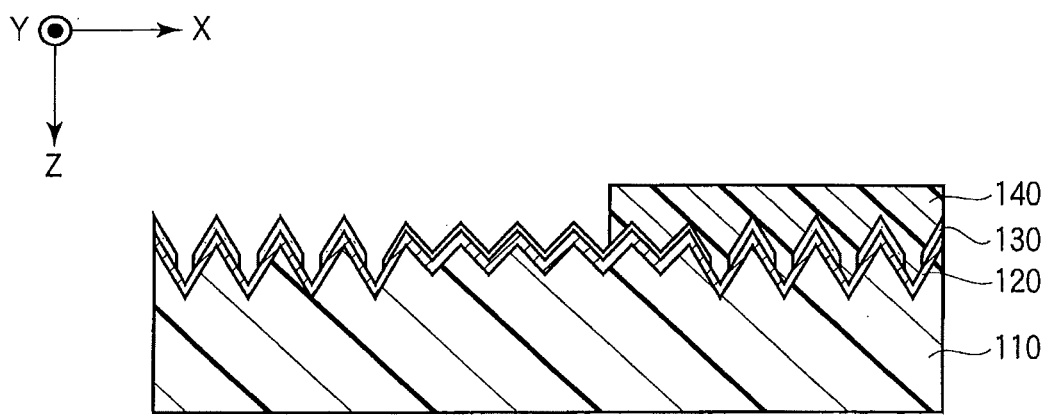
F I G. 16

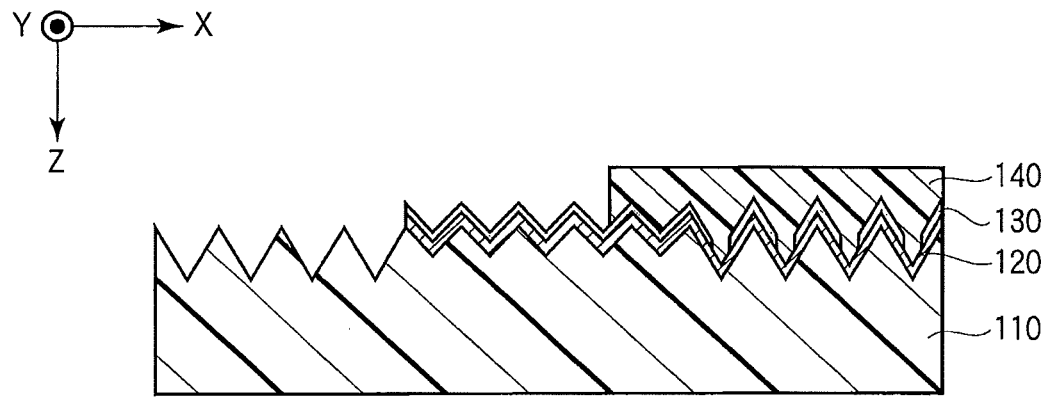
F I G. 17
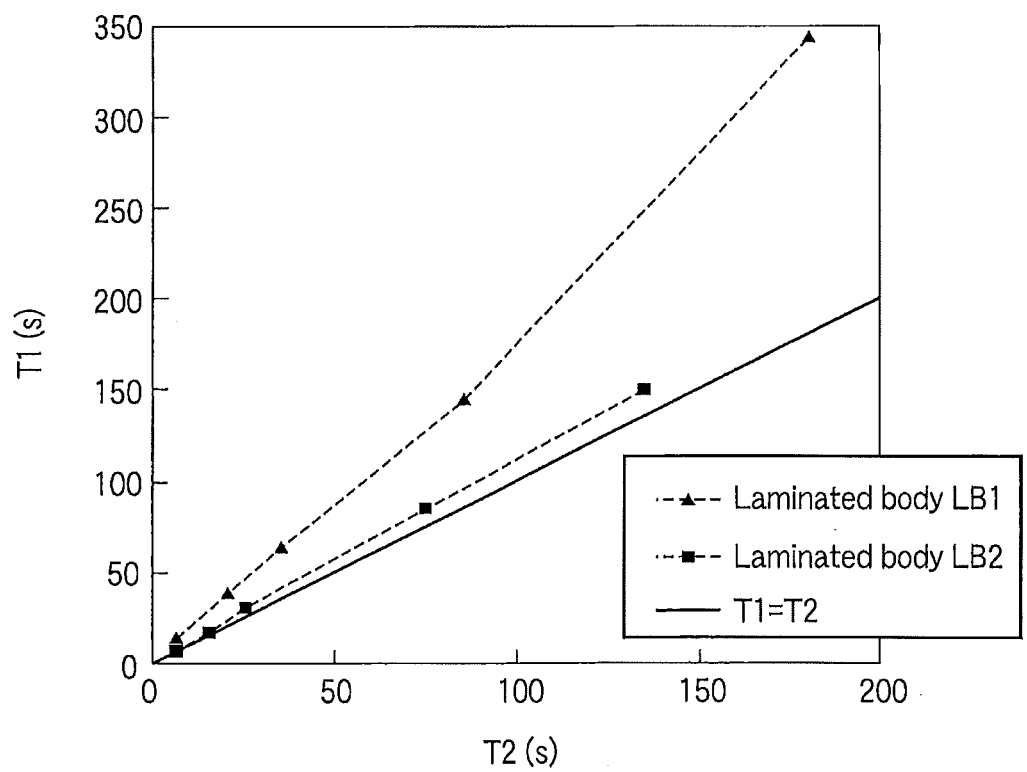
F I G. 18

METHOD OF MANUFACTURING OPTICAL DEVICE

CROSS-REFERENCE TO RELATED APPLICATIONS

This application is a Divisional Application of U.S. application Ser. No. 13/302,461, filed Nov. 22, 2011, which is based upon and claims the benefit of priority to and is a continuation Application of PCT Application No. PCT/JP2010/060306, filed Jun. 17, 2010, which is based upon and claims the benefit of foreign priority to Japanese Patent Applications No. 2009-145532, filed Jun. 18, 2009; and No. 2010-092079, filed Apr. 13, 2010, the entire contents of all of which are incorporated herein by reference.

BACKGROUND

1. Field

The present invention relates to an optical technique that offers, for example, forgery prevention effect, decorative effect and/or aesthetic effect.

2. Description of the Related Art

Securities, certificates, brands, media for personal authentication, etc. are required to be difficult to forge. Thus, in some cases, an optical device excellent in forgery prevention performance is provided on such articles.

Most of the optical devices include a microstructure such as diffraction grating, hologram, lens array, etc. The microstructures are hard to analyze. Further, in order to manufacture an optical device including the microstructure, an expensive manufacturing apparatus such as electron beam writer is necessary. For these reasons, the above optical devices achieve an excellent performance in forgery prevention.

Normally, the optical devices include a relief structure formation layer with a main surface having the microstructure and a reflective layer provided thereon. In this case, the reflective layer may be formed in a pattern on a part of the main surface in order to further enhance the forgery prevention effect. For example, when the reflective layer is provided on the main surface to have contours corresponding to micro-characters, a pattern that emits diffracted light and has a shape corresponding to the micro-characters can be obtained.

As the method of forming a patterned reflective layer, for example, photolithography can be used (for example, refer to Patent Document 1). This method allows forming a patterned reflective layer with high definition.

This method requires alignment of the relief structure formation layer with respect to a mask. Simultaneously achieving a high producibility and a high positional accuracy is, however, impossible or very difficult. For example, according to this method, a displacement of 100 μm or more may be produced between the target position and the contour of the reflective layer.

On the other hand, in Patent Document 2, employed are the following methods in order to form a reflective layer with a high positional accuracy.

In the first method, prepared first is a relief structure formation layer that includes a "first region" having a relief structure with a greater depth to-width ratio and a "second region" as a flat region or a region having a relief structure with a smaller depth-to-width ratio. Subsequently, a metal reflective layer is formed on the relief structure formation layer to have a uniform surface density. Then, the stacked body thus obtained is subjected to an etching treatment.

The portion of the metal reflective layer corresponding to the "first region" is lower in etching resistance than the portion corresponding to the "second region". Therefore, the portion corresponding to the "first region" can be removed before the portion of the metal reflective layer corresponding to the "second region" is removed completely. That is, the metal reflective layer can be formed only on the "second region".

According to this method, however, the portion of the metal reflective layer corresponding to the "second region" is partially removed by the etching treatment. For this reason, there is a possibility that the portion of the metal reflective layer corresponding to the "second region" has an excessively small thickness and thus has an insufficient reflectance. Alternatively, there is a possibility that the thickness of the metal reflective layer greatly varies at the portion corresponding to the "second region". That is, according to this method, it is difficult to stably form the metal reflective layer.

In the second method, utilized is a difference between the transmittance of the portions of the above described stacked body corresponding to the "first region" and the "second region". Specifically, utilized is the fact that the stacked body has a higher transmittance at the portion corresponding to the "first region" than at the portion corresponding to the "second region".

That is, prepared first is a stacked body of a relief structure formation layer and a metal reflective layer. A photosensitive layer is formed on the metal reflective layer. Then, the stacked body is entirely irradiated with light from the relief structure formation layer's side. This makes it possible to cause a photoreaction at a higher efficiency in the portion of the photosensitive layer corresponding to the "first region". Then, either one of the regions of the photosensitive layer corresponding to the "first region" and the "second region" is removed by treating it with a suitable solvent, etc.

Then, the metal reflective layer is subjected to an etching treatment using the partially removed photosensitive layer as a mask. Thus, either of the portions of the metal reflective layer corresponding to the "first region" and the "second region" is removed.

Since the difference between the above reflectances is generally small, the photoreaction also occurs in the portion of the photosensitive layer corresponding to the "second region". Thus, it is in reality impossible or difficult to cause the above-described reaction in only one of the portions of the photosensitive layer corresponding to the "first region" and the "second region". Therefore, when using this method, it is also in fact impossible or difficult to form a metal reflective layer with a high positional accuracy.

Further, this method requires an exposure process for the photosensitive layer. Therefore, this method is disadvantageous in cost and producibility.

PRIOR ART DOCUMENTS

Patent Document 1: Japanese Patent Application Publication No. 2003-255115
Patent Document 2: Japanese Patent Application Publication No. 2008-530600

SUMMARY

An object of the present invention is to provide an optical technique that makes it possible to stably form a reflective layer with a high positional accuracy.

According to a first aspect of the present invention, there is provided an optical device comprising a relief structure formation layer including first and second regions adjacent to each other, the first region including first and second sub-regions, the first sub-region being adjacent to the second region and extending along a boundary between the first and second regions, the second sub-region being adjacent to the second region with the first sub-region interposed therebetween, the second region being provided with recesses or protrusions and having a ratio of surface area to apparent area greater than that of the first region; a first layer made of a first material having a refractive index different from that of a material of the relief structure formation layer and covering at least the second sub-region, a portion of the first layer corresponding to the second sub region having a surface profile corresponding to a surface profile of the second sub-region, a ratio of an amount of the first material at a position of the second region to an apparatus area of the second region being zero or smaller than a ratio of an amount of the first material at a position of the second sub-region to an apparatus area of the second sub-region; and a second layer made of a second material different from the first material and covering the first layer, a ratio of an amount of the second material at a position of the second region to the apparatus area of the second region being zero or smaller than a ratio of an amount of the second material at the position of the second sub-region to the apparatus area of the second sub-region.

According to a second aspect of the present invention, there is provided a method, of manufacturing an optical device, comprising forming a relief structure formation layer including first and second regions adjacent to each other, the second region being provided with recesses or protrusions and having a ratio of surface area to apparent area greater than that of the first region; vapor-depositing a first material having a refractive index different from that of a material of the relief structure formation layer entirely on the first and second regions to form a reflective material layer, the reflective material layer having a surface profile corresponding to surface profiles of the first and second regions, or the reflective material layer having a surface profile corresponding to the surface profile of the first region at a portion corresponding to the first region and being partially opened correspondingly to an arrangement of the recesses or protrusions at a portion corresponding to the second region; vapor-depositing a second material different from the first material on the reflective material layer to form a mask layer, the mask layer having a surface profile corresponding to the surface profiles of the first and second regions, or the mask layer having a surface profile corresponding to the surface profile of the first region at a portion corresponding to the first region and being partially opened correspondingly to the arrangement of the recesses or protrusions at a portion corresponding to the second region; and exposing the mask layer to a reactive gas or liquid capable of causing a reaction with the first material to cause the reaction at least at a position of the second region, thereby obtaining a first layer made of the first material and a second layer made of the second material.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a sectional view schematically showing the method of manufacturing the optical device shown in FIGS. 1 and 2;

FIG. 6 is a sectional view schematically showing the method of manufacturing the optical device shown in FIGS. 1 and 2;

FIG. 7 is a plan view schematically showing an optical device according to a modified example;

FIG. 8 is a sectional view of the optical device taken along a line VIII-VIII shown in FIG. 7;

FIG. 15 is a sectional view schematically showing the method of manufacturing the optical device shown in FIGS. 11 and 12;

FIG. 16 is a sectional view schematically showing the method of manufacturing the optical device shown in FIGS. 11 and 12;

FIG. 17 is a sectional view schematically showing the method of manufacturing the optical device shown in FIGS. 11 and 12; and FIG. 18 is a graph showing an example of a relationship between presence or absence of the mask layer and the etching rate.

DETAILED DESCRIPTION

Figure 1:
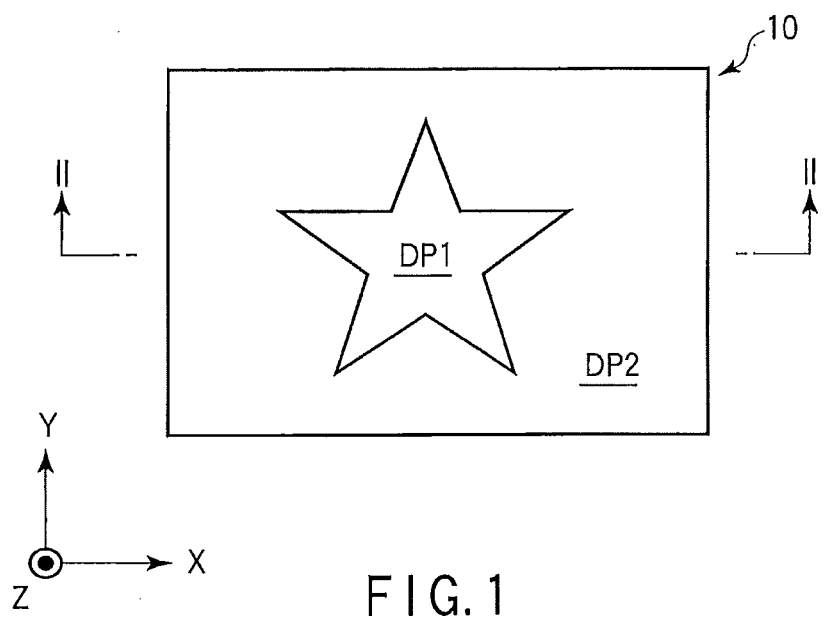
FIG. 1 is a plan view schematically showing an example of an optical device according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Embodiments of the present invention will be described below with reference to drawings. In the drawings, the same reference symbols denote components having the same or similar functions and duplicate descriptions will be omitted.

Figure 2:
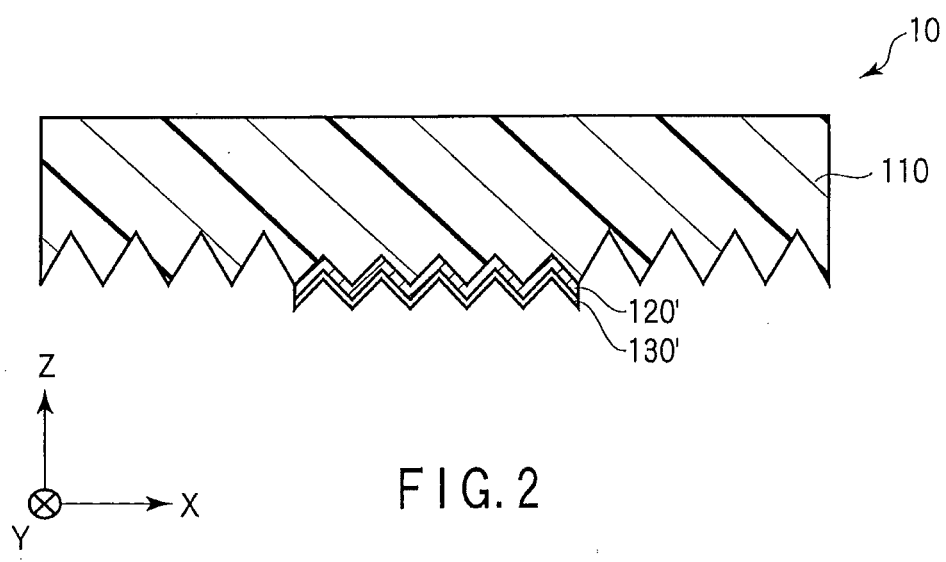
FIG. 2 is a sectional view of the optical device taken along a line II-II shown in FIG. 1.

FIG. 1 is a plan view schematically showing an example of an optical device according to an embodiment of the present invention. FIG. 2 is a sectional view of the optical device taken along a line II-II shown in FIG. 1. In FIGS. 1 and 2, the X and Y directions are parallel with a main surface of the optical device 10 and perpendicular to each other, while the Z direction is perpendicular to the main surface of the optical device 10. Further, in FIG. 1, the display portion DP1 is the portion of the optical device 10 that corresponds to the first region R1 described later, while the display portion DP2 is the portion of the optical device 10 that corresponds to the second region R2 described later.

The optical device 10 shown in FIGS. 1 and 2 includes a relief structure formation layer 110, a first layer 120' and a second layer 130'.

On one main surface of the relief structure formation layer 110, relief structures are provided. The first layer 120' partially covers the main surface of the relief structure formation layer 110. The second layer 130' covers the first layer 120'. The structure of the optical device 10, etc. will be described later in more detail.

A method of manufacturing the optical device 10 shown in FIGS. 1 and 2 will be described with reference to FIGS. 3 to 6.

FIGS. 3 to 6 are sectional views schematically showing a method of manufacturing the optical device shown in FIGS. 1 and 2.

Figure 3:
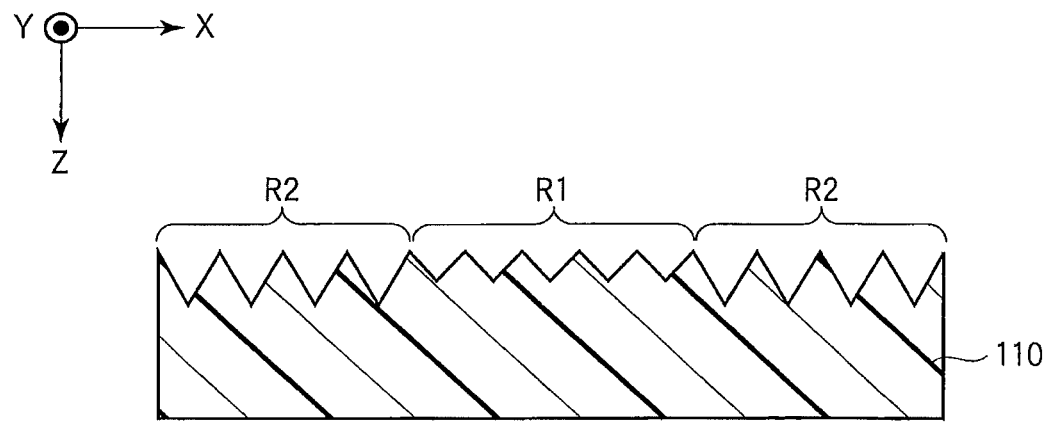
FIG. 3 is a sectional view schematically showing a method of manufacturing the optical device shown in FIGS. 1 and 2.

In this method, prepared first is a relief structure formation layer 110 that has a main surface including a first region R1 and a second region R2 as shown in FIG. 3.

The first region R1 is flat or provided with a recessed structure and/or a protruding structure. Recesses and protrusions constitute the recessed structure and the protruding structure, respectively. In the case where the first region R1 is provided with the recesses or protrusions, the recesses or protrusions may be arranged one-dimensionally or two dimensionally. Also, in this case, the recesses or protrusions may be arranged regularly or randomly. FIG. 3 shows the case where the first region R1 is provided with grooves as the recesses that are arranged one-dimensionally and regularly. Typically, the grooves form a diffraction grating or hologram that emits a diffracted light when illuminated with a white light.

The cross sections of the grooves that are perpendicular to the lengthwise directions thereof have, for example, tapered shapes such as shapes of letters V and U or rectangular shapes. FIG. 3 shows the case where the cross sections are V-shaped as an example.

The widths of the openings of the grooves provided to the first region R1 are set within, for example, a range of 100 to 3,000 nm. The depths of the grooves are set within, for example, a range of 20 to 1,500 nm. The mean value of ratios of the depths to the widths of the openings of the grooves is set, for example, at 0.5 or less, and typically within a range of 0.05 to 0.3.

The second region R2 is provided with a recessed structure and/or a protruding structure. Recesses and protrusions constitute the recessed structure and the protruding structure, respectively. The recesses or protrusions may be arranged one-dimensionally or two dimensionally. Also, the recesses or protrusions may be arranged regularly or randomly. FIG. 3 shows the case where the second region R2 is provided with grooves as the recesses that are arranged one dimensionally and regularly.

The cross sections of the grooves that are perpendicular to the lengthwise directions thereof have, for example, tapered shapes such as shapes of letters V and U or rectangular shapes. FIG. 3 shows the case where the cross sections are V-shaped as an example.

The second region R2 has a ratio of a surface area to an apparent area greater than that of the first region R1. Here, an "apparent area" of a region means an area of an orthogonal projection of the region on a plane parallel with the region, that is, an area of the region from which the recessed structure and the protruding structure are omitted. On the other hand, a "surface area" of a region means an area of the region in consideration of the recessed structure and the protruding structure.

In the case where the first region R1 is provided with the recesses or protrusions, the recesses or protrusions on the second region R2 typically have a mean value of ratios of the depths to the diameters or widths of the openings of the recesses or a mean value of ratios of the heights to the diameters or widths of the bottoms of the protrusions greater than that of the recesses or protrusions on the first region R1. In the example shown in FIG. 3, the groves on the second region R2 have a ratio of the depth to the width of the opening of the groove greater than that of the grooves on the first region R1.

The widths of the grooves on the second region R2 are set within, for example, a range of 100 to 3,000 nm. The depths of the grooves are set within, for example, a range of 80 to 6,000 nm. In the case where both the regions R1 and R2 are provided with the grooves, the mean value of the ratios of the depths to the widths of the openings of the grooves on the second region R2 is set greater than the mean value of the ratios of the depths to the widths of the openings of the grooves on the first region R1. The mean value of the ratios of the depths to the widths of the openings of the grooves on the second region R2 is set within, for example, a range of 0.8 to 2.0, and typically a range of 0.8 to 1.2. When the value is excessively large, there is a possibility that the producibility of the relief structure formation layer 110 is degraded.

The relief structure formation layer 110 can be formed by, for example, pressing a stamping die provided with fine protrusions against a resin. The protrusions have shapes that correspond to the shapes of the recesses on the region R2 or the recesses on the regions R1 and R2.

The relief structure formation layer 110 is formed by, for example, a method in which a substrate is coated with a thermoplastic resin and then a plate having the above-described protrusions thereon is pressed against the resin while applying heat thereto. In this case, as the thermoplastic resin, for example, acrylic resin, epoxy resin, cellulosic resin, vinyl resin, mixtures thereof or copolymers thereof is used.

Alternatively, the relief structure formation layer 110 may be formed by a method in which a substrate is coated with a thermosetting resin, a plate having the above-described protrusions thereon is pressed against the resin while applying heat thereto, and then the plate is removed therefrom. In this case, as the thermosetting resin, for example, urethane resin, melamine resin, epoxy resin, phenol resin, mixtures thereof or copolymers thereof is used. Note that the urethane resin can be obtained by, for example, adding polyisocyanate as a crosslinking agent to acrylic polyol or polyester polyol having a reactive hydroxyl group and causing crosslinking reaction thereof.

Alternatively, the relief structure formation layer may be formed by a method in which a substrate is coated with a radiation-curing resin, the rein is irradiated with radiation such as ultraviolet ray while pressing the late against the resin, and then the plate is removed therefrom. Alternatively, the relief structure formation layer may be formed by a method in which the composition is injected between a substrate and the plate, this material is cured by a radiation exposure, and then the plate is removed therefrom.

The radiation-curing resin typically contains a polymerizable compound and an initiator.

As the polymerizable compound, for example, a compound capable of causing a photo-induced radical polymerization is used. As the compound capable of causing a photo-induced radical polymerization, for example a monomer, oligomer or polymer having an ethylenic unsaturated bond or ethylenic unsaturated group is used. Alternatively, as the compound capable of causing a photo-induced radical polymerization, a monomer such as 1,6-hexanediol, neopentyl glycol diacrylate, trimethylol propane triacrylate, pentaerythritol triacrylate, pentaerythritol tetraacrylate, pentaerythritol pentaacrylate and dipentaerythritol hexaacrylate; an oligomer such as epoxy acrylate, urethane acrylate and polyester acrylate; or a polymer such as urethane-modified acrylic resin and epoxy-modified acrylic resin may be used.

In the case where the compound capable of causing a photo-induced radical polymerization is used as the polymerizable compound, a photo-induced radical polymerization initiator is used as the initiator. As the photo-induced radical polymerization initiator, for example, benzoin-based compound such as benzoin, benzoin methyl ether and benzoin ethyl ether; anthraquinone-based compound such as anthraquinone and methyl anthraquinone; phenyl ketone-based compound such as acetophenone, diethoxy acetophenone, benzophenone, hydroxy acetophenone, 1-hydroxycyclohexyl phenyl ketone, α-aminoacetophenone and 2-methyl-1-(4-methyl thiophenyl)-2-morpholinopropane-1-one; benzyldimethyl ketal; thioxanthone; acylphosphine oxide; or Michler's ketone is used.

Alternatively, a compound capable of causing photo-induced cationic polymerization may be used as the polymerizable compound. As the compound capable of causing photo-induced cationic polymerization, for example, a monomer, oligomer or polymer having an epoxy group; a compound having an oxetane skeleton; or vinyl ether is used.

In the case where the compound capable of causing photo-induced cationic polymerization is used as the polymerizable compound, a photo-induced cationic polymerization initiator is uses as the initiator. As the photo-induced cationic polymerization initiator, for example, aromatic diazonium salt, aromatic iodonium salt, aromatic sulfonium salt, aromatic sulfonium salt, aromatic phosphonium salt or a metal salt with mixed ligands is used.

Alternatively, a mixture of the compound capable of causing a photo-induced radical polymerization and the compound capable of causing a photo-induced cationic polymerization may be used as the polymerizable compound. In this case, as the initiator, for example, a mixture of the photo-induced radical polymerization initiator and the photo-induced cationic polymerization initiator is used as the initiator. Alternatively, in this case, an initiator that can function as both the photo-induced radical polymerization initiator and the photo-induced cationic polymerization initiator may be used. As such an initiator, for example, aromatic iodonium salt or aromatic sulfonium salt is used.

Note that a proportion of the initiator in the radiation-curing resin is set within, for example, a range of 0.1% to 15% by mass.

The radiation-curing resin may further contain sensitizing dye, dye, pigment, polymerization inhibitor, leveling agent, antifoaming agent, anti sagging agent, adhesion promoter, coating surface modifying agent, plasticizer, nitrogen containing compound, crosslinking agent such as epoxy resin, release agent or a combination thereof. The radiation-curing resin may further contain non reactive resin in order to improve the moldability. As the non-reactive resin, for example, the above described thermoplastic resin and/or thermosetting resin can be used.

The above-described plate used for forming the relief structure formation layer 110 is manufactured, for example, using an electron beam writer or nanoimprinting apparatus. In this case, the above described recesses or protrusions can be formed with a high degree of accuracy. Note that in normal cases, a reversal plate is manufactured first by transferring the relief structure of the original plate thereon, and replicated plates are manufactured by transferring the relief structure of the reversal plate thereon. Further, reversal plate is manufactured using the replicated plate as an original plate and replicated plates are manufactured by transferring the relief structure of the reversal plate thereon, if necessary. In actual manufacturing processes, the replicated plate thus obtained is used in normal cases.

The relief structure formation layer 110 typically includes a substrate and a resin layer formed thereon. As the substrate, a film substrate is used typically. As the film substrate, for example, a plastic film such as polyethylene terephthalate (PET) film, polyethylene naphthalate (PEN) film and polypropylene (PP) film is used. Alternatively, paper, synthetic paper, multilayer plastic paper or resin-impregnated paper may be used as the substrate. The substrate may be omitted.

The resin layer is formed by, for example, the above-described method. The thickness of the resin layer is set within, for example, a range of 0.1 to 10 μm. When the thickness is excessively large, squeeze-out and/or wrinkling of the resin due to the pressure induced on the processing are prone to occur. When the thickness is excessively small, there is a possibility that formation of the recessed structure and/or protruding structure is difficult. The thickness of the resin layer is set equal to or greater than the depth or height of the recesses or protrusions provided on the main surface thereof. The thickness is set at a value, for example, 1 to 10 times, typically a value 3 to 5 times the depth of height of the recesses or protrusions.

Formation of the relief structure formation layer 110 may be performed by the "press method" described in Japanese Patent No. 4194073, the "casting method" described in Japanese Utility Model No. 2524092, or the "photopolymer method" described in Japanese Patent Application Publication No. 2007-118563.

Next, a first material having a refractive index different from that of the material of the relief structure formation layer 110 is vapor-deposited on the regions R1 and R2. Thus, a reflective layer 120 is formed on the main surface of the relief structure formation layer 110 that includes the regions R1 and R2.

As the first material, for example, a material having a refractive index different from that of the material of the relief structure formation layer 110 by 0.2 or more is used. When this difference is small, there is a possibility that a reflection by the interface between the relief structure formation layer 110 and the first layer 120' described later is less prone to occur.

As the first material, used typically is at least one metal material selected from the group consisting of Al, Sn, Cr, Ni, Cu, Au, Ag and alloys thereof.

Alternatively, as the first material with a relatively high transparency, the ceramic material or the organic polymer material listed below may be used. Note that the parenthesized numerical value following the chemical formula or compound name indicates the refractive index of the corresponding material.

That is, as the ceramic material, for example, $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (5), $WO_3$ (5), SiO (5), $Si_2O_3$ (2.5), $In2O_3$ (2.0), PbO (2.6), $Ta_2O_3$ (2.4), ZnO (2.1), ZrO2 (5), MgO (1), $SiO_2$ (1.45), $Si_2O_2$ (10), $MgF_2$ (4), $CeF_3$ (1), $CaF_2$ (1.3-1.4), $AlF_3$ (1), $Al_2O_3$ (1) or GaO (2) can be used.

As the organic polymer material, for example, polyethylene (1.51), polypropylene (1.49), polytetrafluoroethylene (1.35), polymethylmethacrylate (1.49) or polystyrene (1.60) can be used.

The vapor deposition of the first material is performed using, for example, vacuum evaporation, sputtering, or chemical vapor deposition (CVD).

The vapor deposition is performed with uniform density in-plane directions parallel with the main surface of the relief structure formation layer 110. Specifically, the vapor deposition is performed such that a ratio of the amount of the first material at the position of the first region R1 to the apparent area of the first region R1 and a ratio of the amount of the first material at the position of the second region R2 to the apparent area of the second region R2 are equal to each other.

Regarding to the vapor deposition, the thickness in the case of supposing the main surface of the relief structure formation layer 110 is constituted entirely by a flat surface (hereinafter referred to as target thickness) is typically determined as follows. That is, the target thickness is determined such that the reflective material layer 120 satisfies the following conditions.

Firstly, the portion of the reflective material layer 120 corresponding to the first region R1 has a surface configuration that corresponds to the surface configuration of the first region R1. In the example shown in FIG. 4, this portion forms a continuous film having a surface configuration that corresponds to the grooves on the first region R1.

Figure 4:
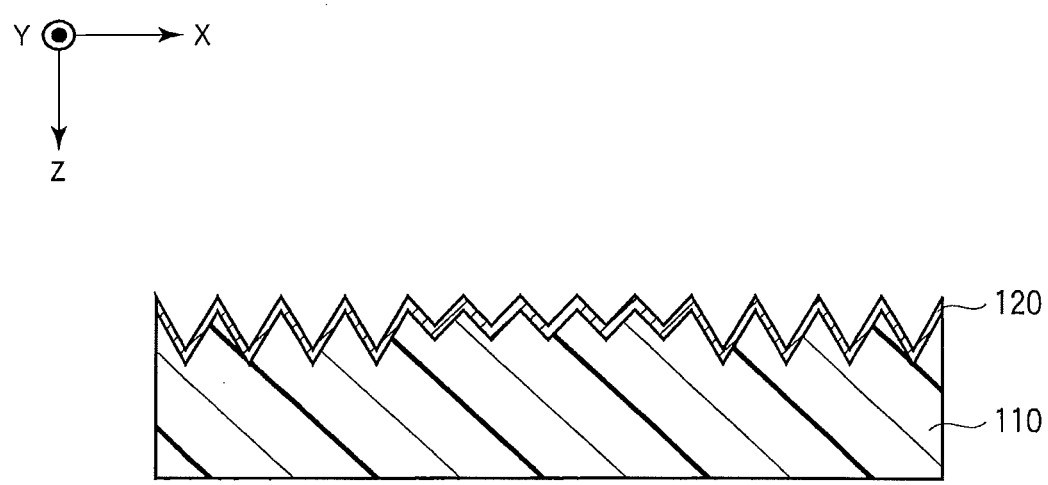
FIG. 4 is a sectional view schematically showing the method of manufacturing the optical device shown in FIGS. 1 and 2.

Secondly, the portion of the reflective material layer 120 corresponding to the second region R2 has a surface configuration that corresponds to the surface configuration of the second region R2 or partially opens correspondingly to the arrangement of the recesses or protrusions on the second region R2. FIG. 4 shows the former case as an example. That is, in the example shown in FIG. 4, this portion forms a continuous film having a surface configuration that corresponds to the grooves on the second region R2.

As described above, the second region R2 has a ratio of the surface area to the apparent area greater than that of the second region R2. Thus, in the case where the target thickness is determined such that the reflective material layer 120 has a surface configuration corresponding to the surface configurations of the regions R1 and R2, the portion of the reflective material layer 120 corresponding to the second region R2 has a smaller mean thickness as compared with the portion of the reflective material layer 120 corresponding to the first region R1.

Here a "mean thickness" of a layer means a mean value of distances between points on a main surface of the layer and corresponding foots of perpendicular lines that extend from the points to the other main surface of the layer.

When the target thickness is set at a smaller value, the reflective material layer 120 can be formed to have a surface configuration corresponding to the surface configuration of the first region R1 at the portion corresponding to the first region R1 and partially open correspondingly to the arrangement of the recesses and protrusions at the portion corresponding to the second region R2.

The target thickness of the reflective material layer 120 is typically set smaller than the depth or height of the recesses or protrusions on the second region R2. In the case where the first region R1 is provided with the recesses or protrusions, the target thickness is typically set smaller than the depth or height thereof.

Specifically, the target thickness of the reflective material layer 120 is set within, for example, a range of 5 to 500 nm, and typically a range of 30 to 300 nm. When the target thickness is excessively small, there is a possibility that a reflection by an interface between the relief structure formation layer 110 and the first layer 120' described later is less prone to occur. When the target thickness is excessively large, there is a possibility that the reflective material layer 120 is difficult to form to satisfy the above-described conditions.

The mean thickness of the portion of the reflective material layer 120 corresponding to the first region R1 is set within, for example a range of 5 to 500 nm, and typically a range of 30 to 300 nm. When the mean thickness is excessively small, there is a possibility that a reflection by an interface between the relief structure formation layer 110 and the first layer 120' described later is less prone to occur. When the mean thickness is excessively large, there is a possibility that the producibility of the optical device 10 is degraded.

Subsequently, a second material different from the material of the reflective material layer 120 is vapor deposited on the reflective material layer 120 as shown in FIG. 5. Thus, formed is a mask layer 130 that faces the relief structure formation layer 110 with the reflective material layer 120 interposed therebetween.

As the second material, an inorganic material is typically used. Examples of the inorganic material include $MgF_2$, Sn, Cr, ZnS, ZnO, Ni, Cu, Au, Ag, $TiO_2$, MgO, $SiO_2$ and $Al_2O_3$. In particular, in the case where $MgF_2$ is used as the second material, the mask layer 130 and the second layer 130' can deliver a higher performance in the conformability and abrasion resistance when the substrate is bent or an impact is applied thereto.

Alternatively, an organic material may be used as the second material. As the organic material, for example, an organic material having a weight-average molecular weight of 1,500 or less is used. Examples of such an organic material include a polymerizable compound such as acrylate, urethaneacrylate and epoxyacrylate. Alternatively, as the organic material, it is possible to use a substance obtained by mixing the polymerizable compound and an initiator together, vapor-depositing the radiation-curing resin thus obtained, and irradiating it with radiation to cause polymerization.

Alternatively, metal alkoxide may be used as the second material. Alternatively, as the second material, it is possible to use a substance obtained by vapor-depositing the metal alkoxide and causing polymerization thereof. In this case, a dry treatment may be performed between the vapor deposition and the polymerization.

The vapor deposition of the second material is performed using, for example, vacuum evaporation, sputtering or CVD.

The vapor deposition is performed with uniform density in-plane directions parallel with the main surface of the relief structure formation layer 110. Specifically, the vapor deposition is performed such that a ratio of the amount of the second material at the position of the first region R1 to the apparent area of the first region R1 and a ratio of the amount of the second material at the position of the second region R2 to the apparent area of the second region R2 are equal to each other.

Regarding to the vapor deposition, the target thickness of the mask layer 130 is determined as follows. That is, the target thickness is determined such that the mask layer 130 satisfies the following conditions.

Firstly, the portion of the mask layer 130 corresponding to the first region R1 has a surface configuration that corresponds to the surface configuration of the first region R1. In the example shown in FIG. 5, this portion forms a continuous film having a surface configuration that corresponds to the grooves on the first region R1.

Secondly, the portion of the mask layer 130 corresponding to the second region R2 has a surface configuration that corresponds to the surface configuration of the second region R2 or partially opens correspondingly to the arrangement of the recesses or protrusions on the second region R2. FIG. 5 shows the latter case as an example. That is, in the example shown in FIG. 5, this portion forms a discontinuous film on the reflective material layer 120 that partially opens correspondingly to the arrangement of the grooves on the second region R2.

As described above, the second region R2 has a ratio of the surface area to the apparent area greater than that of the second region R2. Thus, in the case where the target thickness is determined such that the mask layer 130 has a surface configuration corresponding to the surface configurations of the regions R1 and R2, the portion of the mask layer 130 corresponding to the second region R2 has a smaller mean thickness as compared with the portion of the mask layer 130 corresponding to the first region R1.

When the target thickness is set at a smaller value, the mask layer 130 can be formed to have a surface configuration corresponding to the surface configuration of the first region R1 at the portion corresponding to the first region R1 and partially open correspondingly to the arrangement of the recesses and protrusions at the portion corresponding to the second region R2.

The target thickness of the mask layer 130 is typically set smaller than the depth or height of the recesses or protrusions on the second region R2. In the case where the first region R1 is provided with the recesses or protrusions, the target thickness is typically set smaller than the depth or height thereof. Further, the target thickness of the mask layer 130 is typically set smaller than the target thickness of the reflective material layer 120.

Specifically, the target thickness of the mask layer 130 is set within, for example, a range of 0.3 to 200 nm, and typically a range of 3 to 80 nm. When the target thickness is excessively small, there is a possibility that the mean thickness of the portion of the mask layer 130 corresponding to the first region R1 is excessively small, and thus the protection of the portion of the reflective material layer 120 corresponding to the first region R1 by the mask layer 130 is insufficient. When the target thickness is excessively large, there is a possibility that the protection of the portion of the reflective material layer 120 corresponding to the second region R2 by the mask layer 130 is excessive.

The mean thickness of the portion of the mask layer 130 corresponding to the first region R1 is typically set smaller than the mean thickness of the portion of the reflective material layer 120 corresponding to the first region R1.

The mean thickness of the portion of the mask layer 130 corresponding to the first region R1 is set within, for example a range of 0.3 to 200 nm, and typically a range of 3 to 80 nm. When the mean thickness is excessively small, there is a possibility that the mean thickness of the portion of the mask layer 130 corresponding to the first region R1 is excessively small, and thus the mean thickness of the portion of the first layer 120' described later corresponding to the first region R1 is excessively small. When the target thickness is excessively large, there is a possibility that the protection of the portion of the reflective material layer 120 corresponding to the second region R2 by the mask layer 130 is excessive.

Subsequently, the mask layer 130 is exposed to a reactive gas or liquid that can react with the material of the reflective material layer 120. This allows the material of the reflective material layer 120 to cause the above-described reaction at least at a position of the second region R2.

Here, described is the case where an etching liquid capable of dissolving the material of the reflective material layer 120 is used as the reactive gas or liquid. An alkaline solution such as sodium hydroxide solution, sodium carbonate solution and potassium hydroxide solution is typically used as the etching liquid. Alternatively, an acidic solution such as hydrochloric acid, nitric acid, sulfuric acid and acetic acid may be used as the etching liquid.

As shown in FIG. 5, the portion of the mask layer 130 corresponding to the first region R1 forms a continuous film, while the portion corresponding to the second region R2 forms a discontinuous film that opens partially. The reactive gas or liquid can easily come in contact with the portion of the reflective material layer 120 that is not covered by the mask layer 130 as compared with the portion of the reflective material layer 120 that is covered by the mask layer 130. Thus, the former is easily etched than the latter.

When the portion of the reflective material layer 120 that is not covered by the mask layer 130 is removed, openings corresponding to the openings of the mask layer 130 are produced in the reflective material layer 120. When the etching treatment is further continued, the etching of the reflective material layer 120 proceeds in the in-plane directions at the positions of the openings. As a result, above the second region R2, the portion of the reflective material layer that supports the mask layer 130 is removed together with the mask layer 130 thereon.

Therefore, by adjusting the concentration and temperature of the etching liquid and the duration of etching, etc., only the portion of the reflective material layer 120 that corresponds to the second region R2 can be removed as shown in FIG. 6. Thus, obtained is the first layer 120' that covers only the first region R1 of the regions R1 and R2.

The optical device 10 shown in FIGS. 1 and 2 is thus obtained.

The optical device 10 obtained by the above described method has the following characteristics.

The first layer 120' is a reflective layer and typically made of the above-described first material. The first layer 120' covers only the first region R1 of the regions R1 and R2. That is, the first layer 120' is provided only at a position corresponding to the first region R1. A ratio of the amount of the first material at the position of the second region R2 to the apparent area of the second region R2 is zero.

The first layer 120' has a surface configuration that corresponds to the surface configuration of the first region R1. In the example shown in FIGS. 1 and 2, the first layer 120' has a surface configuration that corresponds to the grooves on the first region R1. The grooves on the first region R1 typically form on the surface of the first layer 120' a diffraction grating or hologram that emits a diffracted light when illuminated with a white light. In this case, the display portion DP1 of the optical device 10 can display a color corresponding to the diffracted light. Therefore, in this case, a higher forgery prevention effect and a higher decorative effect can be achieved.

An orthogonal projection of the contour of the first layer 120' on the main surface of the relief structure formation layer 110 entirely overlaps the contour of the first region R1. That is, the first layer 120' is patterned correspondingly to the shape of the first region R1. Thus, when the regions R1 and R2 are formed with a high positional accuracy, the first layer 120' can be formed with a high positional accuracy.

Note that in the method described with reference to FIGS. 3 to 6, the portion of the reflective material layer 12 corresponding to the first region R1 is covered with the mask layer 130. Thus, in the case where the above-described etching treatment is performed, the thickness of the portion is scarcely decreased or is not decreased at all. Therefore, the mean thickness of the portion of the first layer 120' corresponding to the first region R1 is typically equal to the mean thickness of the portion of the reflective material layer 120 corresponding to the first region R1. That is, the mean thickness falls within, for example, a range of 5 to 500 nm, and typically a range of 30 to 300 nm.

Note that the maximum value of the shortest distances from the boundary between the regions R1 and R2 to the contour of the first layer 120' is set, for example, less than 20 µm, preferably less than 10 µm, and more preferably less than 3 µm.

The second layer 130' is, for example, a layer formed by vapor deposition. The second layer 130' covers the first layer 120'. The second layer 130' faces only the first region R1 of the regions R1 and R2 with the first layer 120' interposed therebetween. That is, the orthogonal projection of the contour of the first layer 120' on the main surface of the relief structure formation layer 110 entirely overlaps an orthogonal projection of the contour of the second layer 130' on the main surface. A ratio of the amount of the second material at the position of the second region R2 to the apparent area of the second region R2 is zero.

The mean thickness of the portion of the second layer 130' corresponding to the first region R1 is equal to or smaller than the mean thickness of the portion of the mask layer 130 corresponding to the first region R1. The mean thickness falls within, for example, a range of 0.3 to 200 nm, and typically a range of 3 to 80 nm.

The second layer 130' plays, for example, a role of protecting the first layer 120'. In the case where the second layer 130' is provided, forgery of the optical device 10 is more difficult as compared with the case where the second layer 130' is absent.

In the case where a colored material is used as the second material and the optical device 10 is observed from the side of the second layer 130', the second layer 130' makes it possible to change the color of the portion of the optical device 10 where the first layer 120' is provided without affecting the color of the other portion of the optical device 10. For example, in the case where Al is used as the first material and Sn or Cr is used as the second material, it is possible to impart a blackish color to the portion of the optical device 10 where the first layer 120' is provided. Alternatively, in the case where Al is used as the first material and ZnS is used as the second material, it is possible to impart a yellowish color to the portion of the optical device 10 where the first layer 120' is provided. Note that in the case where the mean thickness of the first layer 120' is small, these effects can be obtained when the optical device 10 is observed from the side of the relief structure formation layer 110.

In the above, described is the case where both the regions R1 and R2 are provided with grooves arranged regularly. The structures of the regions R1 and R2 are not limited to this.

For example, the first region R1 may be flat. In this case, the display portion D1 is seen, for example, like a specular surface. Note that in this case, the ratio of the surface area to the apparent area of the first region R1 is equal to 1.

Alternatively, the first region R1 may be provided with recesses or protrusions arranged two dimensionally. In this case, the recesses or protrusions are typically tapered. For example, the recesses or protrusions have a shape of a circular cone, a pyramid, a circular truncated cone, a truncated pyramid, an elliptic paraboloid or a paraboloid of revolution. The sidewalls of the recesses or protrusions may be smooth or stepwise. Alternatively, the recesses or protrusions may have columnar shapes such as circular columns or prisms.

The recesses or protrusions arranged two dimensionally may be arranged regularly or randomly. In the former case, the recesses or protrusions typically form on the surface of the first layer 120' a diffraction grating or hologram that emits a diffracted light when illuminated with a white light.

In the case where the first region R1 is provided with the recesses or protrusions arranged two dimensionally, the recesses or protrusions are arranged in a square lattice. Alternatively, the recesses or protrusions may be arranged in a rectangular or triangle lattice.

In the case where the first region R1 is provided the recesses or protrusions arranged two-dimensionally, the mean value of the diameters of the openings of the recesses or the mean value of the diameters of the bottoms of the protrusions is set within, for example, a range of 100 to 3,000 nm. The mean value of the depths of the recesses or the mean value of the heights of the protrusions is set within, for example, a range of 20 to 1,500 nm. The mean value of ratios of the depths to the diameters of the recesses or the mean value of the ratios of the heights to diameters of the bottoms of the protrusions is set, for example, at 0.5 or less, and typically within a range of 0.05 to 0.3.

The second region R2 may be provided with recesses or protrusions arranged two-dimensionally. The recesses or protrusions can employ, for example, the same structure as that described for the recesses or protrusions of the first region R1 except that the mean value of the ratios of the depths to the diameters of the recesses or the mean vale of the ratios of the heights to the diameters of the bottoms of the protrusions is greater.

In the case where the second regions R2 is provided with the recesses or protrusions arranged two dimensionally, the mean value of the diameters of the openings of the recesses or the mean value of the diameters of the bottoms of the protrusions is set within, for example, a range of 100 to 3,000 nm. The mean value of the depths of the recesses or the mean value of the heights of the protrusions is set within, for example, 80 to 6,000 nm. The mean value of the ratios of the depths to the diameters of the recesses or the mean value of the ratios of the heights to the diameters of the bottom of the protrusions is set within, for example, a range of 0.8 to 2.0, and typically a range of 0.8 to 1.5.

The recesses or protrusions provided to the regions R1 and R2 may form a relief hologram, a diffraction grating, a sub-wavelength grating, micro lenses, a polarizing element, a condensing element, a scattering element, a diffusing element or a combination thereof.

In the above, described is the case where the reflective material layer 120 has a surface configuration that corresponds to the surface configurations of the regions R1 and R2, the portion of the mask layer 130 corresponding to the first region R1 has a surface configuration that corresponds to the surface configuration of the first region R1, and the portion of the mask layer 130 corresponding to the second region R2 partially opens correspondingly to the arrangement of the recesses or protrusions on the second region R2. The structures of the layers are not limited to this.

For example, it is possible to employ the structure in which both the reflective material layer 120 and the mask layer have surface configurations that correspond to the surface configurations of the regions R1 and R2. In this case, as described above, portions of the reflective material layer 120 and the mask layer 130 corresponding to the second region R2 have mean thicknesses smaller than the mean thicknesses of the portions of these layers corresponding to the first region R1, respectively.

In general, the portion of the mask layer 130 having a smaller mean thickness is prone to allow the reactive gas or liquid to permeate as compared with the portion having a larger mean thickness. In the case where the reactive gas or liquid reacts with the second material, and the reaction product is readily removed from the mask layer 130, the mask layer 130 can be opened only above the second region R2.

Therefore, also in this case, by adjusting the concentration and temperature of the etching liquid and the duration of the etching treatment, etc., the optical device 10 shown in FIGS. 1 and 2 can be manufactured.

Alternatively, it is possible to employ the structure in which both the reflective material layer 120 and the mask layer have surface configurations that correspond to the surface configurations of the first region R1 at the portions corresponding to the first region R1 and partially open correspondingly to the arrangement of the recesses or protrusions on the second region R2 at the portion corresponding to the second region R2. Also, in this case, by adjusting the concentration and temperature of the etching liquid and the duration of the etching treatment, etc., the optical device 10 shown in FIGS. 1 and 2 can be manufactured.

In the above, described is the case where the portions of the reflective material layer 120 and the mask layer 130 corresponding to the second region R2 are removed completely. The removal may be performed such that parts of the portions remain. For example, it is possible to shorten the duration of the etching treatment so as to make the ratio of the amount of the first material at the position of the second region 2 to the apparent area of the second region R2 greater than zero and smaller than the ratio of the amount of the first material at the position of the first region R1 to the apparent area of the first region R1. Alternatively, in a similar way, the ratio of the amount of the second material at the position of the second region 2 to the apparent area of the second region R2 may be made greater than zero and smaller than the ratio of the amount of the second material at the position of the first region R1 to the apparent area of the first region R1.

Further, in the above, described is the case where each of the reflective material layer 120 and the first layer 120' has a single-layer structure. Each of the layers may have a multi-layer structure. By employing this structure, for example, the first layer 120' of the optical device 10 may form a multilayer interference film.

In this case, the first layer 120' includes, for example, a multilayer film in which a miller layer, a spacer layer and a half-mirror layer are stacked in this order from the side of the relief structure formation layer 110.

The miller layer is a metal layer and typically includes an elemental metal or an alloy. Examples of the metal included in the miller layer include aluminum, gold, copper and silver. As the metal, aluminum is in particular preferable. The thickness of the miller layer is set, for example, at 300 nm or less, and typically within a range of 20 to 200 nm.

The spacer layer typically includes a dielectric material. Preferably, the refractive index of the dielectric material is 1.65 or less. Further, it is preferable that the dielectric material is transparent. Examples of the dielectric material include $SiO_2$ and $MgF_2$. The thickness of the spacer layer is set within, for example, a range of 5 to 500 nm.

The half-miller layer is a reflective layer having a light-transmitting property and typically includes an elemental metal, an alloy, a metallic oxide or a metallic sulfide. Examples of the metal or alloy included in the half-miller layer include aluminum, nickel, Inocel (registered trademark), titanium oxide ($TiO_2$), zinc sulfide (ZnS), molybdenum sulfide ($MoS_2$) and ferric oxide (III) ($Fe_2O_3$). The thickness of the half-miller layer is set within, for example, a range of 5 to 80 nm. In the case where a metallic oxide such as titanium oxide or a metallic sulfide such as zinc sulfide, which is a material with a high transparency and a high refractive index, is used, the thickness is preferably set within a range of 30 to 80 nm. In the case where a metal such as aluminum, which is a material with a high reflectance and a high light-shielding property, is used, the thickness is preferably set within a range of 5 to 45 nm.

In the above, described is the case where each of the mask layer 130 and the second layer 130' has a single-layer structure. Each of the layers may have a multilayer structure. By employing this structure, for example, the second layer 130' of the optical device 10 may form a multilayer interference film.

Alternatively, the laminated structure of the first layer 120' and the second layer 130' may form a multilayer interference film.

In these cases, when the method described with reference to FIGS. 3 to 6 is employed, it is possible to stably form the multilayer interference film with a high positional accuracy.

In the method described with reference to FIGS. 3 to 6, the steps described with reference to FIGS. 4 and 6 may be repeated after forming the first layer 120' and the second layer 130'. This makes it possible to obtain a structure in which the first layer 120' and the second layer 130' are stacked alternately. Thus, it is possible, for example, to form a multilayer interference film on the first region R1. Also in this case, the multilayer interference film can be formed stably with a high positional accuracy.

In the above, described is the case where an etching liquid used as the reactive gas or liquid. The reactive gas or liquid is not limited to this. For example, an etching gas that can vaporize the material of the reflective material layer 120 may be used as the reactive gas or liquid.

Alternatively, a gas or liquid that can react with the first material to change a portion of the reflective material layer 120 into a layer made of a material different from the first material may be used as the reactive gas or liquid. In this case, for example, it is possible to change the portion of the reflective material layer 120 corresponding to the second region R2 into a layer made of a material different from the first material instead of removing this portion.

As such a reactive gas or liquid, for example, an oxidizer that can oxidize the first material can be used. Examples of the oxidizer include oxygen, ozone, or halogen; halides such as chlorine dioxide, hypohalous acid, subhalogen acid, perhalogen acid, and salts thereof; inorganic peroxides such as hydrogen peroxide, persulfates, peroxocarbonates, peroxosulfates, and peroxophosphates; organic peroxides such as benzoyl peroxide, t-butylhydroperoxide, cumene hydroperoxide, diisopropylbenzene hydroperoxide, performic acid, peracetic acid, perbenzoic acid; metals or metal compounds such as cerium salts, salts of Mn (III), Mn (IV) and Mn (VI), silver salts, copper salts, chromium salts, cobalt salts, dichromates, chromates, permanganates, magnesium perphthalate, ferric chloride, and cupric chloride; or inorganic acids or inorganic salts such as nitric acid, nitrates, bromates, periodates, and iodates.

For example, in the case where Cu is used as the material of the reflective material layer 120', when the portion of the reflective material layer 120' corresponding to at least the second region R2 is reacted with the oxidizer, the portion can be changed into a layer made of Cu oxide. Alternatively, in the case where Al is used as the material of the reflective material layer 120', when the portion of the reflective material layer 120' corresponding to at least the second region R2 is reacted with the oxidizer, the portion can be changed into a layer made of Al oxide such as boehmite.

Alternatively, a reducer that can reduce the material of the reactive material layer 120' may be used as the above-described reactive gas or liquid. As the reducer, for example, hydrogen sulfide, sulfur dioxide, hydrogen fluoride, alcohols, carboxylic acids, hydrogen gas, hydrogen plasma, remote hydrogen plasma, diethylsilane, ethylsilane, dimethylsilane, phenylsilane, silane, disilane, aminosilane, boranes, diborane, alane, germane, hydrazine, ammonia, hydrazine, methylhydrazine, 1,1-dimethylhydrazine, 1,2 dimethyldhyrazine, t-butylhydrazine, benzylhydrazine, 2-hydrazinoethanol, 1-n-butyl-1-phenylhydrazine, phenylhydrazine, 1-naphthylhydrazine, 4-chlorophenylhydrazine, 1,1-diphenylhydrazine, p hydrazinobenzenesulfonic acid, 1,2-diphenylhydrazine, acetylhydrazine, or benzoylhydrazine is used.

In the method described with reference to FIGS. 3 to 6, the second layer 130' may be removed after forming the first layer 120' by etching treatment, etc. The removal of the second layer 130' is effective, for example, in the case where ionization of the first material due to the difference between the ionization tendencies of the first and second materials is concerned.

FIG. 7 is a plan view schematically showing an optical device according to a modified example. FIG. 8 is a sectional view of the optical device taken along a line VIII-VIII shown in FIG. 7. The optical device 10 shown in FIGS. 7 and 8 can be manufactured by the same method as that described with reference to FIGS. 3 to 6 except that the structures of the regions R1 and R2 included in the main surface of the relief structure formation layer 110 are changed.

In the optical device 10 shown in FIGS. 7 and 8, the first region R1 has a contour corresponding to micro-characters "TP".

The first region R1 includes a flat region FR constituted by a flat surface and an uneven region UR provided with recesses or protrusions. The uneven region UR is bordered with the flat region FR. In FIG. 7, the portion of the optical device 10 corresponding to the flat region FR is a display portion DPF, while the portion of the optical device 10 corresponding to the uneven region UR is a display portion DPU.

The width of the display portion DPF bordering the display portion DPU falls within, for example, a range of 10 to 2,000 μm, and typically a range of 50 to 1,000 μm. In order to form such a display portion DPF, the first layer 120' need to be formed with an extremely high positional accuracy. Therefore, formation of such an optical device 10 using a conventional patterning method is impossible or very difficult.

On the other hand, when using the method described with reference to FIGS. 3 to 6, the first layer 120' can be formed with a high positional accuracy as described above. Therefore, when using this method, even a fine image such as the above-described micro characters can be displayed with a high definition.

Figure 9:
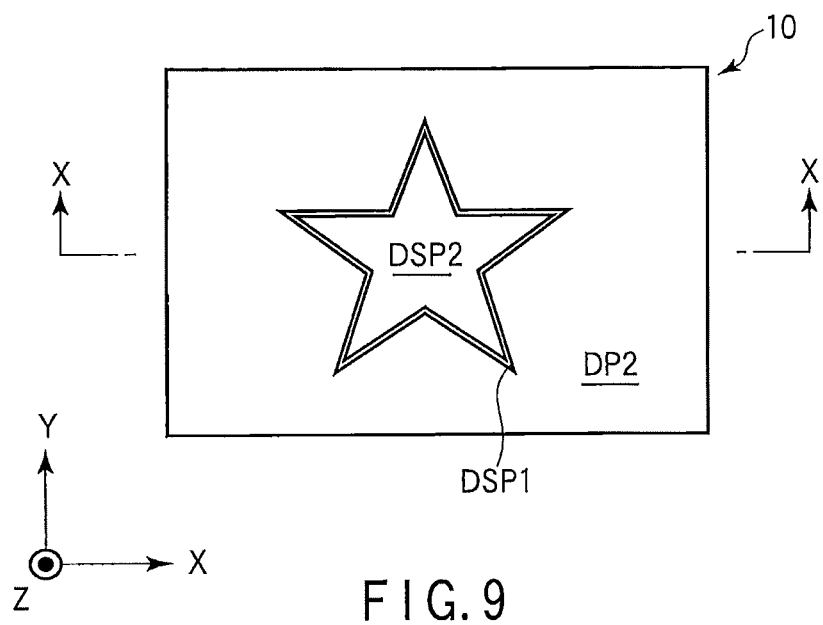
FIG. 9 is a plan view schematically showing an optical device according to another modified example.
Figure 10:
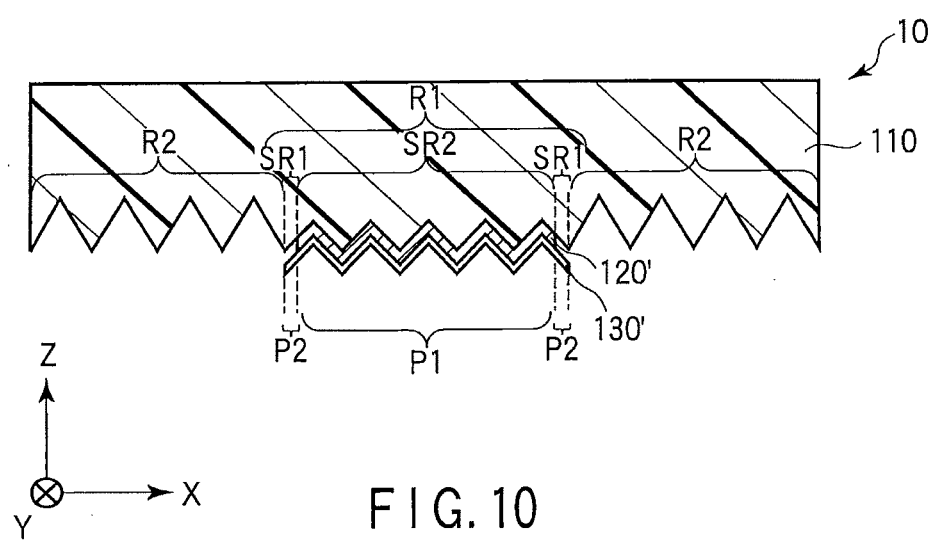
FIG. 10 is a sectional view of the optical device taken along a line X-X shown in FIG. 9.

FIG. 9 is a plan view schematically showing an optical device according to another modified example. FIG. 10 is a sectional view of the optical device taken along a line X-X shown in FIG. 9. In FIG. 9, the portion of the optical device corresponding to the first sub-region SR1, which will be described later, is a display portion DSP1, while the portion of the optical device corresponding to the second sub-region SR1 is a display portion DSP2.

The optical device 10 shown in FIGS. 9 and 10 has the same structure as that of the optical device shown in FIGS. 1 and 2 except for the followings.

That is, in the optical device 10 shown in FIGS. 9 and 10, the first region R1 includes a first sub-region SR1 and a second sub-region SR2. The first sub-region SR1 is adjacent to the second region R2 and extends along the boundary between the regions R1 and R2. The second sub-region SR2 is adjacent to the second region R2 with the first sub-region SR1 interposed therebetween. The contour of the second sub-region SR2 typically has a shape similar to the contour of the first region R1.

The first layer 120' is provided only at the position corresponding to the second sub-region SR2. That is, only the second sub-region SR2 of the regions R1 and R2 is covered with the first layer 120'. Further, the portion of the first layer 120' corresponding to the second sub-region SR2 has a surface configuration that corresponds to the surface configuration of the second sub-region SR2.

The mean thickness of the portion of the first layer 120' corresponding to the second sub-region SR2 falls within, for example, a range of 5 to 500 nm, and typically a range of 5 to 300 nm. When the mean thickness is excessively small, there is a possibility that the reflection by the interface between the relief structure formation layer 110 and the first layer 120' is less prone to occur. When the mean thickness is excessively large, there is a possibility that the producibility of the optical device 10 is degraded.

Typically, the second layer 130' faces the entire surface of the first region R1. That is, the second layer 130' typically includes a first portion P1 covering the first layer 120' and a second portion P2 outwardly protruding from the first portion P1. Typically, a first orthogonal projection of the contour of the first layer 120' on the main surface of the relief structure formation layer 110 has a shape similar to a second orthogonal projection of a contour of the vapor-deposited layer on the main surface and is surrounded by the second orthogonal projection.

Therefore, for example, in the case where the second material is colored, it is possible to display different colors at the portion DSR1 of the optical device 10 corresponding to the first sub-region SR1 and the portion DSR2 of the optical device 10 corresponding to the second sub-region SR2. The difference between the colors can be perceived, for example, by the observation of the optical device 10 using a microscope. Alternatively, in the case where the area occupied by the first sub-region SR1 is large, the difference between the colors can be perceived with unaided eyes. As above, the optical device 10 described with reference to FIGS. 9 and 10 can achieve a special optical effect.

The mean thickness of the portion of the second layer 130' corresponding to the second sub-region SR2 falls within, for example, a range of 0.3 to 200 nm, and typically a range of 3 to 80 nm.

The optical device 10 shown in FIGS. 9 and 10 is manufactured by, for example, the following method. That is, by adjusting the concentration and temperature of the etching liquid and the duration of the etching treatment, a side-etching is caused at a portion of the reflective material layer 120 corresponding to the first region R1 after the steps described with reference to FIGS. 3 to 5. This removes the portion of the reflective material layer 120 corresponding to the first sub-region SR1 together with the portions of the reflective material layer 120 and the mask layer 130 corresponding to the second region R2. Thus, the optical device 10 shown in FIGS. 9 and 10 is obtained.

The above-described side-etching starts at the contour of the portion of the reflective material layer 120 corresponding to the first region R1 and progresses toward the inside at a substantially constant rate. Thus, the variations of the width of the portion removed by this side-etching, i.e., the variations of the distance from the contour of the first sub-region SR1 to the contour of the first region is relatively small. Thus, the contour of the second sub-region SR2 typically has a shape similar to the contour of the first region R1. Therefore, even in the case of employing such a method, the first layer 120' can be formed with a high positional accuracy.

Since the portion of the reflective material layer 120 corresponding to the first region R1 is covered with the mask layer 130, no etching or almost no etching occurs at the main surface under the condition that the side-etching occurs at the side surface. Therefore, even in the case of employing such a method, the first layer 120' can be formed stably.

In the above, described is the structure in which the first orthogonal projection of the contour of the first layer 120' on the relief structure formation layer 110 has a shape similar to the second orthogonal projection of the contour of the vapor-deposited layer on the main surface and is surrounded by the second orthogonal projection. The structures of the first layer 120' and the second layer 130' are not limited to this. For example, in the case where the structure after the etching treatment is cut across the first region R1, a part of the first orthogonal projection overlaps a part of the second orthogonal projection, while the remainder of the first orthogonal projection has a shape similar to the remainder of the second projection and is surrounded by the second projection.

Figure 11:
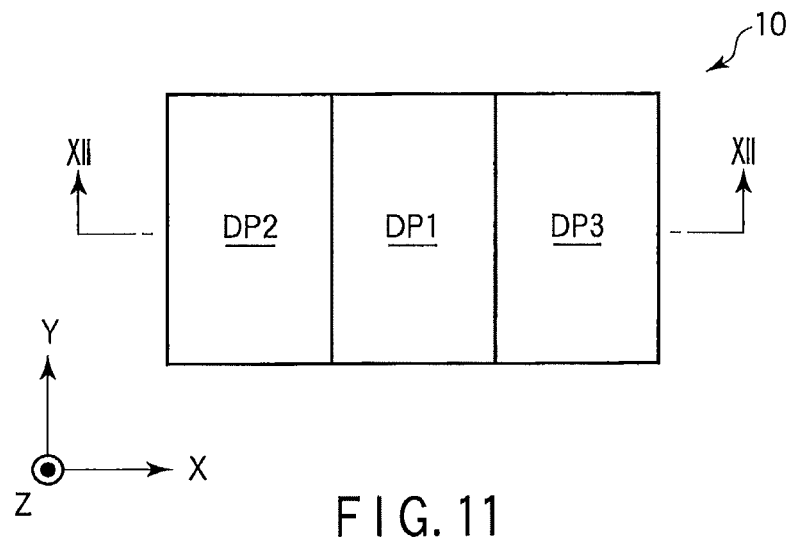
FIG. 11 is a plan view schematically showing an optical device according to another embodiment of the present invention.
Figure 12:
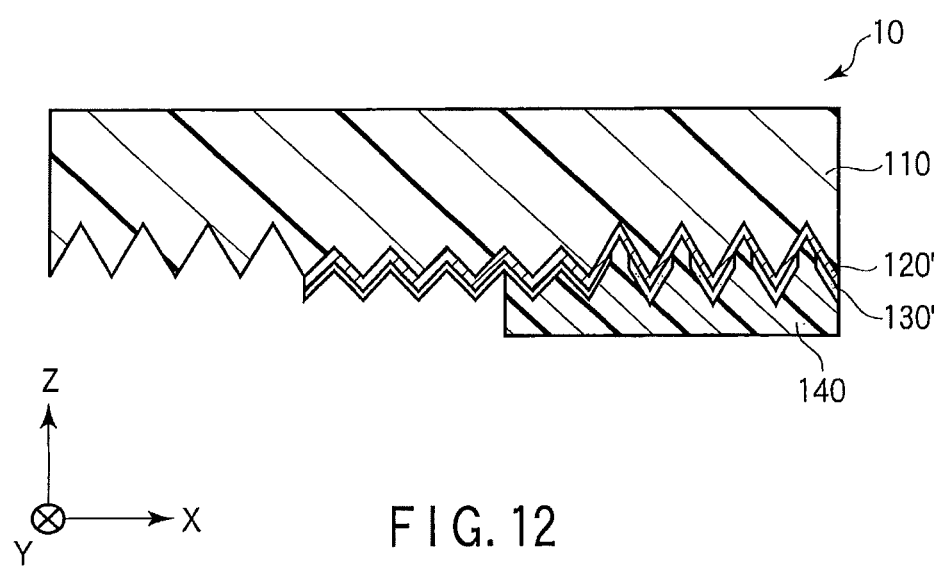
FIG. 12 is a sectional view of the optical device taken along a line XII-XII shown in FIG. 11.

FIG. 11 is a plan view schematically showing an optical device according to another embodiment of the present invention. FIG. 12 is a sectional view of the optical device taken along a line XII-XII shown in FIG. 11. FIGS. 13 to 17 are sectional views schematically showing a method of manufacturing the optical device shown in FIGS. 11 and 12. Note that in FIG. 11, the portion of the optical device 10 corresponding to the third region R3, which will be described later, is indicated as a display portion DP3.

A method of manufacturing the optical device 10 shown in FIGS. 11 and 12 will be described below with reference to FIGS. 13 to 17.

Figure 13:
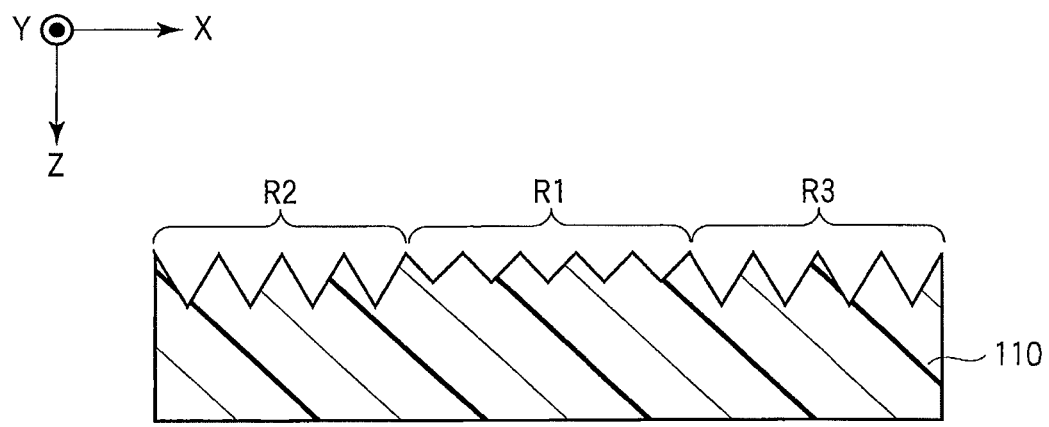
FIG. 13 is a sectional view schematically showing a method of manufacturing the optical device shown in FIGS. 11 and 12.

First, prepared is a relief structure formation layer 110 having a main surface that includes a first region R1, a second region R2 and a third region R3 as shown in FIG. 13. The relief structure formation layer 110 has the same structure as that of the relies structure formation layer described with reference to FIG. 3 except that this relief structure formation layer 110 further includes the third region R3.

The third region R3 is provided with recesses or protrusions. The third region R3 has a ratio of the specific surface area to the apparent area greater than that of the first region R1. Typically, the third region R3 has the same structure as that of the second region R2.

Figure 14:
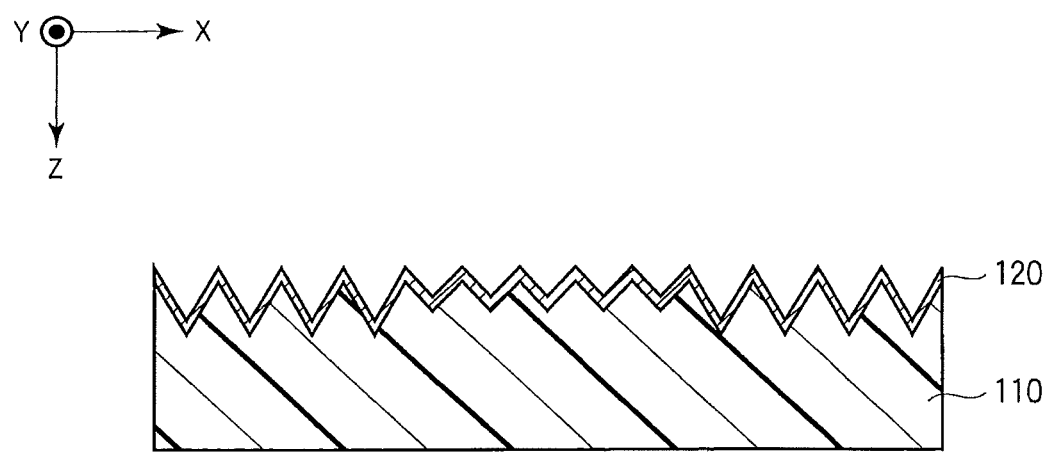
FIG. 14 is a sectional view schematically showing the method of manufacturing the optical device shown in FIGS. 11 and 12.

Next, a first material is vapor-deposited on the regions R1 to R3 as shown in FIG. 14. This obtains a reflective material layer 120. Formation of the reflective material layer 120 is performed by the same method as that described with reference to FIG. 4. In the example shown in FIG. 14, the portion of the reflective material layer 120 corresponding to the first region R1 forms a continuous film having a surface configuration that corresponds to the grooves on the first region R1. The portions of the reflective material layer 120 corresponding to the regions R2 and R3 form discontinuous films that partially open correspondingly to the arrangements of the groove on the regions R2 and R3.

Subsequently, formed is a cover layer 140 that faces only the third region R3 of the regions R2 and R3. The cover layer 140 may further face at least a portion of the first region R1. FIG. 16 shows the case where the cover layer 140 faces the entire third region R3 and a part of the first region R1.

Formation of the cover layer 140 can be performed using a known pattern formation method. As the pattern formation method, for example, flexographic printing, gravure printing, inkjet printing, offset printing or security intaglio printing is used. As the material of the cover layer 140, for example, the above-described thermoplastic resin, thermosetting resin or radiation-curing resin is used. Alternatively, as the material of the cover layer 140, a high-temperature resin such as polycarbonate, polyamide and polyimide, a mixture thereof or a copolymer thereof may be used. In order use the material as paint for printing, the resin may be dissolved in a solvent such as water or organic solvent and added with dye, pigment, leveling agent, antifoaming agent, anti-sagging agent, adhesion promoter, coating surface-modifying agent, plasticizer, nitrogen-containing compound, crosslinking agent such as epoxy resin or a combination thereof, if necessary.

Then, the mask layer 130 and the cover layer 140 are exposed to a reactive gas or liquid that can react with the material of the reflective material layer 120. This allows the material of the reflective material layer 120 to cause the reaction with the material of the reflective material layer 120 at least at a position of the second region R2. Here, described is the case where an etching liquid capable of dissolving the material of the reflective material layer 120 is used as an example of the reactive gas or liquid.

As shown in FIG. 16, the portion of the mask layer 130 corresponding to the first region R1 forms a continuous film, while the portion corresponding to the second region R2 forms a discontinuous film that opens partially. Thus, the portion of the mask layer 130 corresponding to the second region R2 is easily etched than the portion corresponding to the first region R1.

As shown in FIG. 16, the cover layer 140 is formed on the portion of the mask layer 130 corresponding to the third region R3. On the other hand, the cover layer 140 is not formed on the portion of the mask layer 130 corresponding to the second region R2. Thus, the portion of the mask layer 130 corresponding to the second region R2 is easily etched than the portion corresponding to the third region R3.

Therefore, by adjusting the concentration and temperature of the etching liquid and the duration of etching, etc., only the portion of the reflective material layer 120 that corresponds to the second region R2 can be removed as shown in FIG. 17. Note that when the portion of the reflective layer 120 corresponding to the second region R2 is removed, the portion of the mask layer 130 corresponding to the second region R2 is also removed.

The optical device 10 shown in FIGS. 11 and 12 is thus obtained.

The optical device 10 includes the relief structure formation layer 110, the first layer 120', the second layer 130' and the cover layer 140. In the optical device 10, the first layer 120' is also present on the region other than the first region R1, i.e., the third region R3. Therefore, for example, when the third region R3 is provided with recesses or protrusions that offers an optical effect of hologram, diffraction grating, sub-wavelength grating, zero-order diffraction filter, polarized light separation filter, etc., an optical device 10 offering a further special visual effect can be obtained.

The optical device 10 may further include a protective film. The optical device 10 may have antireflection treatment on the surface thereof. In the manufacture of the optical device 10, at least one surface of the layers included in the optical device 10 may be subjected to corona treatment, flame treatment or plasma treatment.

Two or more of the embodiments and modifications described above may be combined with each other.

The above-described techniques may be combined with a known process for partially forming a reflective layer. As the known process, for example, used is a laser method in which a part of a reflective is removed using a laser to form a pattern. Alternatively, as this process, it is possible to use a method in which forming a patterned mask on a reflective layer and removing the portion of the mask not covered by the mask. Alternatively, as this process, it is possible to use a method in which a patterned mask is formed on a main surface of a layer or substrate, forming a reflective layer on the entire main surface, and then the portion of the reflective layer on the mask is removed together with the mask. Note that formation of the mask is performed, for example, using printing method or photoresist method.

The optical device 10 may be uses as a part of an adhesive label. The adhesive label includes the optical device 10 and an adhesive layer provided on the back surface of the optical device 10.

Alternatively, the optical layer 10 may be used as a part of a transfer foil. The transfer foil includes the optical device 10 and a support layer releasably supporting the optical device 10.

The optical device 10 may be supported by an article. For example, the optical device 10 may be supported by a plastic card, etc. Alternatively, the optical device 10 may be embedded in a paper. The optical device 10 may be broken into flakes and used as a component of pigment.

The optical device 10 may be used for purposes other than forgery prevention. For example, the optical device can be used as a toy, educational material, or decoration.

EXAMPLES

Relationship Between Presence or Absence of Mask Layer and Etching Rate

Studied first was a relationship between the presence or absence of the mask layer 130 and the etching rate of the portions of the reflective material layer 120 corresponding to the regions R1 and R2.

(Manufacture of Laminated Body LB1)

A laminated body of the relief structure formation layer 110, the reflective material layer 120 and the mask layer 130 was manufactured by the following method.

First, a composition containing 50.0 parts by mass of urethane (meta)acrylate, 30.0 parts by mass of methyl ethyl ketone, 20.0 parts by mass of ethyl acetate and 1.5 parts by mass of photoinitiator was prepared as the material of an ultraviolet-curing resin. As the urethane (meta)acrylate, used was a multi-functional substance having a molecular weight of 6,000. As the photoinitiator, "Irgacure 184" manufactured by CIBA SPECIALITY CORP. was used.

Next, the above-described composition was applied to a transparent PET film with a thickness of 23 μm by gravure printing such that the coated film thus obtained had a thickness of 1 μm in a dried state.

Then, an original plate provided with protrusions was fixed on a cylindrical surface of a printing cylinder, and the coated film was irradiated with ultraviolet ray from the PET film's side while pressing the original plate against the coated film so as to cure the ultraviolet-curing resin. Here, the pressing was performed under the conditions that the pressure was 2 kgf/cm$^2$, the temperature was 80° C., and the speed was 10 m/minute. The ultraviolet irradiation was performed using a high-pressure mercury-vapor lamp at an intensity of 300 mJ/cm$^2$.

Thus, obtained was the relief structure 110 having a main surface including the regions R1 and R2.

The relief structure formation layer 110 had grooves arranged regularly on the entire first region R1. The cross sections of the grooves were V-shaped. The pitch of the grooves was 1,000 nm. The width of the opening of each groove was 1,000 nm, while the depth of each groove was 100 nm. That is, on the first region R1, formed were grooves each having a ratio of the depth to the width of the opening of the groove of 100 nm/1,000 nm=0.1.

The relief structure formation layer 110 further had recesses arranged in a square lattice on the entire second region R2. The recesses were pyramidal. The minimum center-to-center distance of the recesses was 333 nm. The width of the opening of each recess was 333 nm, while the depth thereof was 333 nm. That is, on the second region R2, formed were recesses each having a ratio of the depth to the width of the opening of the groove of 333 nm/333 nm=1.0.

Subsequently, Al as the first material was deposited on the above-described main surface of the relief structure formation layer by vacuum evaporation. Thus, the reflective material layer 120 was formed. Here, the target thickness of the reflective material layer 120 was set at 50 nm.

Then, MgF$_2$ as the second material was deposited on the main surface of the reflective material layer 120 opposite to the relief structure formation layer 110 by vacuum evaporation. Thus, the mask layer 130 was formed. Here, the target thickness of MgF$_2$ was set at 20 nm.

As above, the laminated body including the relief structure formation layer 110, the reflective material layer 120 and the mask layer 130 was obtained. Hereinafter, the laminated body thus manufactured is referred to as a "laminated body LB1".

(Manufacture of Laminated Body LB2; Comparative Example)

A laminated body of the relief structure formation layer 110 and the reflective material layer 120 was manufactured by the method as that described for the laminated body LB1 except that formation of the mask layer 130 was omitted. Hereinafter, the laminated body is referred to as a "laminated body LB2".

(Evaluation)

The laminated bodies LB1 and LB2 were subjected to an etching treatment using aqueous sodium hydroxide. Here, the temperature of the aqueous sodium hydroxide was changed, and the following evaluation was performed in each case. That is, measured were the time T1 for the transmittance of the portion of the laminated body corresponding to the first region R1 to reach 20% and the time T2 for the transmittance of the portion of the laminated body corresponding to the second region R2 to reach 80%. FIG. 18 shows the results. Note that the concentration of the aqueous sodium hydroxide was 0.1 mol/L, and the temperatures of the solution were 60° C., 50° C., 40° C., 30° C. and 25° C. in decreasing order of temperature.

FIG. 18 is a graph showing an example of a relationship between presence or absence of the mask layer and the etching rate. FIG. 18 shows the measurement results of the time T1 and T2 for each of the laminated bodies LB1 and LB2 and a linear line represented by a formula: T1=T2. Note that the data on each curve are arranged in decreasing order of temperature of the aqueous sodium hydroxide toward in a direction away from the origin.

According to the measurements, the greater the value of T1 is, the smaller the etching rate at the portion of the reflective material layer 120 corresponding to the second region RG2. Thus, The greater the value of the ratio T1/T2 is, the higher the etching selectivity.

As shown in FIG. 18, for the laminated body LB2, the ratio T1/T2 was almost equal to 1 in the case where the temperature of the aqueous sodium hydroxide was high. That is, in this temperature range, the etching selectivity was low. In the case where the temperature of the aqueous sodium hydroxide was low, when the temperature was lowered, the ratio T1/T2 gradually increased. That is, in this temperature range, the etching selectivity was improved by lowering the temperature of the aqueous sodium hydroxide. Therefore, in the case of using the laminated body LB2, it is necessary to set the temperature of the aqueous sodium hydroxide low in order to manufacture the optical devices with a high stability. In this case, however, the time for the etching treatment should be prolonged inadmissibly. Therefore, in this case, it is impossible or very difficult to simultaneously achieve the producibility and stability in the manufacture of the optical devices.

On the other hand, for the laminated body LB1, the ratio T1/T2 was high regardless of the temperature of the aqueous sodium hydroxide. That is, the laminated body LB1 achieved a high etching selectivity regardless of the temperature of the aqueous sodium hydroxide. Therefore, in the case of using the laminated body LB1, the optical devices can be stably manufactured with a short etching time. That is, in this case, it is possible to simultaneously achieve the producibility and stability in the manufacture of the optical devices.

<Evaluations of Selectivity for Removal of Reflective Material Layer and Positional Accuracy of Reflective Layer>

First, the optical devices OD1 to OD9 were manufactured as follows.

Example 1

Manufacture of Optical Device OD1

The above-described laminated body LB1 was subjected to an etching treatment. Specifically, the laminated body LB1 was exposed to 0.1 mol/L aqueous sodium hydroxide at 60°C for 7 seconds. Thus, the portions of the reflective material layer 120 and the mask layer 130 corresponding to the second region R2 were removed.

As above, the optical device 10 was manufactured. Hereinafter, the optical device 10 is referred to as an "optical device OD1". The optical device OD1 had a laminated structure including the relief structure formation layer 110, the first layer 120' covering only the entire first region R1 of the regions R1 and R2, and the second layer 130' covering the entire first layer 120'.

In the optical device OD1, the mean thickness of the first layer 120' was 50 nm. The mean diameter of the second layer 130' was 20 nm.

Example 2

Manufacture of Optical Device OD2

An optical device was manufactured by the same method as that for the optical device OD1 except that the minimum center-to-center distance of the recesses on the second region R2 was set at 200 nm, and the width of the opening and the depth of each recess were set at 200 nm and 160 nm, respectively. Hereinafter, the optical device is referred to as an "optical device OD2".

In the optical device OD2, a ratio of the depth to the width of the opening of each groove on the first region R1 was 100 nm/1,000 nm=0.1. A ratio of the depth to the width of the opening of each groove on the second region R2 was 160 nm/200 nm=0.8.

In the optical device OD2, the mean thickness of the first layer 120' was 50 nm. The mean diameter of the second layer 130' was 20 nm.

Example 3

Manufacture of Optical Device OD3

An optical device was manufactured by the same method as that for the optical device OD1 except that the pitch of the grooves on the first region R1 was set at 300 nm, the width of the opening and the depth of each groove were set at 300 nm and 100 nm, respectively, the minimum center-to-center distance of the recesses on the second region R2 was set at 375 nm, and the width of the opening and the depth of each recess were set at 375 nm and 300 nm, respectively. Hereinafter, the optical device is referred to as an "optical device OD3".

In the optical device OD3, a ratio of the depth to the width of the opening of each groove on the first region R1 was 100 nm/300 nm=0.33. A ratio of the depth to the width of the opening of each groove on the second region R2 was 300 nm/375 nm=0.8.

In the optical device OD3, the mean thickness of the first layer 120' was 50 nm. The mean diameter of the second layer 130' was 20 nm.

Example 4

Manufacture of Optical Device OD4

An optical device was manufactured by the same method as that for the optical device OD3 except that the minimum center-to-center distance of the recesses on the second region R2 was set at 300 nm, and the width of the opening and the depth of each recess were set at 300 nm and 300 nm, respectively. Hereinafter, the optical device is referred to as an "optical device OD4".

In the optical device OD4, a ratio of the depth to the width of the opening of each groove on the first region R1 was 100 nm/300 nm=0.33. A ratio of the depth to the width of the opening of each groove on the second region R2 was 300 nm/300 nm=1.0.

In the optical device OD4, the mean thickness of the first layer 120' was 50 nm. The mean diameter of the second layer 130' was 20 nm.

Example 5

Manufacture of Optical Device OD5

First, the relief structure formation layer 110 whose main surface included the third region R3 in addition to the regions R1 and R2 was formed by the same method as that described for the laminated body LB1. In the regions R1 and R2 of the relief structure formation layer 110, the same structures as those of the laminated body LB1 were employed. In the third region R3, the same structure as that in the second region R2 was employed.

Next, the reflective material layer 120 and the mask layer 130 were formed by the same method as that described for the laminated body LB1.

Then, using gravure printing, the cover layer 140 was formed to face only the entire third region R3 and a part of the first region R1 of the regions R1 to R3.

Subsequently, an etching treatment was performed by the same method as that described for the optical device OD1. Thus, only the portions of the reflective material layer 120 and the mask layer 130 corresponding to the second region R2 were removed to form the reflective layer 120 and the vapor-deposited layer 130. Hereinafter, the optical device thus obtained is referred to as an "optical device OD5".

In the optical device OD5, a ratio of the depth to the width of the opening of each groove on the first region R1 was 100 nm/1,000 nm=0.1. A ratio of the depth to the width of the opening of each groove on the second region R2 was 333 nm/333 nm=1.0.

In the optical device OD5, the mean thickness of the first layer 120' was 50 nm. The mean diameter of the second layer 130' was 20 nm.

Example 6

Manufacture of Optical Device OD6; Comparative Example

An optical device was manufactured by the same method as that described for the optical device OD1 except that the laminated body LB2 was used instead of the laminated body LB1 and was exposed to 0.1 mol/L aqueous sodium hydroxide at 30° C. for 60 seconds instead of exposing it to 0.1 mol/L aqueous sodium hydroxide at 60° C. for 7 seconds. Hereinafter, the optical device is referred to as an "optical device OD6".

Example 7

Manufacture of Optical Device OD7; Comparative Example

An optical device was manufactured by the same method as that described for the optical device OD6 except that the target thickness of the reflective material layer 120 was set at 20 nm. Hereinafter, the optical device is referred to as an "optical device OD7".

Example 8

Manufacture of Optical Device OD8; Comparative Example

An optical device was manufactured by the same method as that described for the optical device OD6 except that the target thickness of the reflective material layer 120 was set at 80 nm. Hereinafter, the optical device is referred to as an "optical device OD8"

Example 9

Manufacture of Optical Device OD9; Comparative Example

In this example, an optical device was manufactured by the same method as that described for the optical device OD1 except that the mask layer 130 was formed as follows. .

That is, in this example, the mask layer 130 was formed using gravure printing instead of forming it on the entire reflective material layer 120 by vapor deposition. Specifically, prepared first was a composition containing 50.0 parts by mass of vinyl chloride-vinyl acetate copolymer resin, 30.0 parts by mass of methyl ethyl ketone, and 20.0 parts by mass of ethyl acetate. Then, the composition was gravure-printed on the pattern formed by the portion of the reflective material layer 120 corresponding to the first region R1. This printing was performed such that the mask layer 130 had a mean thickness of 1.0 μm. Hereinafter, the optical device is referred to as an "optical device OD9".

(Evaluation)

The selectivity for removal of the reflective material layer 120 was evaluated on each of the optical devices OD1 to OD9. Specifically, for each of the optical devices OD1 to OD9, the transmittances for visible light were measured at portions corresponding to the regions R1 and R2. The optical devices were evaluated as "OK" in the case where the transmittance for visible light at the portion corresponding to the first region R1 was 20% or less and the transmittance for visible light at the portion corresponding to the second region R2 was 90% or more. The other optical devices were evaluated as "NG". The results are summarized in TABLE 1 below.

TABLE 1

| Optical device | Aspect ratio in 1st region | Aspect ratio in 2nd region | Target thickness of reflective material layer (nm) | Target thickness of mask layer (nm) | Selectivity for removal of reflective material layer | Positional accuracy of reflective layer |
|---|---|---|---|---|---|---|
| OD1 | 0.1 | 1.0 | 50 | 20 | OK | OK |
| OD2 | 0.1 | 0.8 | 50 | 20 | OK | OK |
| OD3 | 0.33 | 0.8 | 50 | 20 | OK | OK |
| OD4 | 0.33 | 1.0 | 50 | 20 | OK | OK |
| OD5 | 0.1 | 1.0 | 50 | 20 | OK | OK |
| OD6 | 0.1 | 1.0 | 50 | 0 | NG | OK |
| OD7 | 0.1 | 1.0 | 20 | 0 | NG | OK |
| OD8 | 0.1 | 1.0 | 80 | 0 | NG | OK |
| OD9 | 0.1 | 1.0 | 50 | 1,000 | OK | NG |

In TABLE 1, the "aspect ratio" means a mean value of the ratios of the depths to the widths of the openings of the grooves.

As shown in TABLE 1, in the optical devices OD6 to OD8, the selectivity for removal of the reflective material layer 120 was insufficient. That is, in the optical devices OD6 to OD8, the transmittance for visible light at the portion corresponding to the first region R1 was greater than 20% or the transmittance for visible light at the portion corresponding to the second region R2 was less than 90%. On the other hand, in the optical devices OD1 to OD5 and OD9, the selectivity for removal of the reflective material layer 120 was high.

Next, the positional accuracy of the reflective layer 120 was evaluated on each of the optical devices OD1 to OD9. Specifically, for each optical device, the maximum value of the shortest distances from the boundary between the regions R1 and R2 to the contour of the first layer 120' was measured. The optical devices were evaluated as "OK" in the case where this value was less than 20 μm, while the optical devices were evaluated as "NG" in the case where this value was 20 μm or more. The results are summarized in TABLE 1.

As shown in TABLE 1, in the optical device OD9, the positional accuracy of the reflective layer 120 was insufficient. That is, in the optical device OD9, the maximum value of the shortest distances from the boundary between the regions R1 and R2 to the contour of the first layer 120' was 20 µm or more. On the other hand, in the optical devices OD1 to OD8, the positional accuracy of the reflective layer 120 was high.

As above, the optical devices OD1 to OD5 were excellent in both the selectivity for removal of the reflective material layer 120 and the positional accuracy of the first layer 120'.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

REFERENCE TO SYMBOLS

10 . . . Optical device
110 . . . Relief structure formation layer
120 . . . Reflective material layer
120' . . . First layer
130 . . . Mask layer
130' . . . Second layer
140 . . . Cover layer
DP1 . . . Display portion
DP2 . . . Display portion
DP3 . . . Display portion
DPF . . . Display portion
DPU . . . Display portion
DSP1 . . . Display portion
DSP2 . . . Display portion
P1 . . . First portion
P2 . . . Second portion
R1 . . . First region
R2 . . . Second region
R3 . . . Third region
SR1 . . . First sub-region
SR2 . . . Second sub-region

What is claimed is:

1. A method of manufacturing an optical device, comprising:
forming a relief structure formation layer including first and second regions adjacent to each other, the second region being provided with recesses or protrusions and having a ratio of surface area to apparent area greater than that of the first region;
vapor-depositing a first material having a refractive index different from that of a material of the relief structure formation layer entirely on the first and second regions to form a reflective material layer, the reflective material layer having a surface profile corresponding to surface profiles of the first and second regions, or the reflective material layer having a surface profile corresponding to the surface profile of the first region at a portion corresponding to the first region and being partially opened correspondingly to an arrangement of the recesses or protrusions at a portion corresponding to the second region;
vapor-depositing a second material different from the first material on the reflective material layer to form a mask layer, the mask layer having a surface profile corresponding to the surface profiles of the first and second regions, or the mask layer having a surface profile corresponding to the surface profile of the first region at a portion corresponding to the first region and being partially opened correspondingly to the arrangement of the recesses or protrusions at a portion corresponding to the second region; and
after forming the mask layer, exposing the mask layer to a reactive gas or liquid capable of causing a reaction with the first material to cause the reaction at least at a position of the second region, thereby obtaining a first layer made of the first material and a second layer made of the second material.

2. The method according to claim 1, wherein the reaction changes a part of the reflective material layer into a layer made of a material different from the first material.

3. The method according to claim 1, wherein the reflective material layer is formed to have an average thickness falling within a range of 5 nm to 500 nm at a portion corresponding to the first region, and the mask layer is formed to have an average thickness falling within a range of 0.3 nm to 200 nm at a portion corresponding to the first region.

4. The method according to claim 1, wherein
the main surface of the relief structure formation layer further includes a third region, the third region being provided with recesses or protrusions and having a ratio of surface area to apparent area greater than that of the first region,
the reflective material layer is formed by vapor-depositing the first material entirely on the first to third regions, and
the method further comprises forming a cover layer facing only the third region of the second and third regions prior to causing the reaction.

5. The method according to claim 1, wherein in the exposing the mask layer, the reactive gas or liquid is applied onto portions of the mask layer on the first region, and the mask layer protects portions of the reflective material layer on the first region from the reactive gas or liquid.

6. The method according to claim 1, wherein the reflective material layer is partially removed by the reaction.

7. The method according to claim 6, wherein the partial removal of the reflective material layer obtains the first layer as a layer covering only the first region of the first and second regions.

8. The method according to claim 1, wherein the reflective material layer and the mask layer are formed to have an average collective thickness that is less than a depth or height of the recesses or protrusions.

9. The method according to claim 8, wherein in the exposing the mask layer, the reactive gas or liquid is applied onto portions of the mask layer on the first region, and the mask layer protects portions of the reflective material layer on the first region from the reactive gas or liquid.

* * * * *